(12) United States Patent
Saeki

(10) Patent No.: US 10,236,814 B2
(45) Date of Patent: Mar. 19, 2019

(54) MOTOR CONTROLLER AND METHOD FOR CONTROLLING MOTOR

(71) Applicant: Kabushiki Kaisha Yaskawa Denki, Kitakyushu-shi (JP)

(72) Inventor: Takahiro Saeki, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 31 days.

(21) Appl. No.: 15/429,810

(22) Filed: Feb. 10, 2017

(65) Prior Publication Data
US 2017/0237376 A1 Aug. 17, 2017

(30) Foreign Application Priority Data
Feb. 12, 2016 (JP) .................................. 2016-025219

(51) Int. Cl.
| | |
|---|---|
| H02P 21/34 | (2016.01) |
| H02P 6/14 | (2016.01) |
| H02P 27/08 | (2006.01) |
| H02P 27/04 | (2016.01) |
| H02P 21/24 | (2016.01) |
| H02P 21/18 | (2016.01) |

(52) U.S. Cl.
CPC .............. *H02P 21/34* (2016.02); *H02P 6/14* (2013.01); *H02P 21/18* (2016.02); *H02P 21/24* (2016.02); *H02P 27/047* (2013.01); *H02P 27/08* (2013.01)

(58) Field of Classification Search
CPC .................................. H02P 21/34; H02P 27/08

USPC ................................ 318/799, 798, 767, 727
See application file for complete search history.

(56) References Cited

U.S. PATENT DOCUMENTS

| | | | | |
|---|---|---|---|---|
| 7,102,305 B2* | 9/2006 | Suzuki | ..................... | H02P 21/22 318/400.02 |
| 7,521,887 B2* | 4/2009 | Tobari | ..................... | H02P 21/16 318/400.01 |
| 8,305,019 B2* | 11/2012 | Tobari | ..................... | H02P 6/08 318/38 |
| 2015/0200616 A1 | 7/2015 | Saeki et al. | | |

FOREIGN PATENT DOCUMENTS

| | | |
|---|---|---|
| JP | 2009-77503 A | 4/2009 |
| JP | 2015-133878 A | 7/2015 |

OTHER PUBLICATIONS

Japanese Office Action dated May 16, 2017 in Japanese Patent Application No. 2016-025219 (with unedited computer generated English translation).

\* cited by examiner

*Primary Examiner* — David S Luo
(74) *Attorney, Agent, or Firm* — Oblon, McClelland, Maier & Neustadt, L.L.P.

(57) ABSTRACT

A motor controller includes an inverter including circuitry which supplies power to a motor, and a controller including circuitry which controls the inverter such that the circuitry of the inverter supplies an AC current to a first axis of a stationary orthogonal coordinate system in the motor while changing a frequency of the AC current. The first axis has a predetermined phase relationship with a phase voltage of the motor.

20 Claims, 11 Drawing Sheets

MOTOR CONTROLLER AND METHOD FOR CONTROLLING MOTOR

CROSS-REFERENCE TO RELATED APPLICATIONS

The present application claims priority under 35 U.S.C. § 119 to Japanese Patent Application No. 2016-025219, filed Feb. 12, 2016. The contents of this application are incorporated herein by reference in their entirety.

BACKGROUND

Field of the Invention

The embodiments disclosed herein relate to a motor controller and a method for controlling a motor.

Discussion of the Background

Japanese Unexamined Patent Application Publication No. 2015-133878 discloses a motor controller that controls a motor. When an instantaneous power failure or a similar situation occurs, the motor controller temporarily keeps its inverter from supplying power to the motor, turning the motor into, for example, free-run state or coast-rotation state (these states will be hereinafter collectively referred to as free-run state).

After recovery from the instantaneous power failure, the motor controller causes the inverter to supply power to the motor. If there is a wide discrepancy between the rotational frequency of the motor and the output frequency of the inverter, such consequences may occur as: an undesirable amount of torque that may cause jerks; overcurrent; and overvoltage.

In order to avoid these consequences, the motor controller makes the rotational frequency of the motor and the output frequency of the inverter identical to each other when the inverter supplies power to the motor. For this purpose, the motor controller has a function to detect the rotational frequency of the motor in free-run state (this function will be hereinafter occasionally referred to as speed search).

SUMMARY

According to one aspect of the present disclosure, a motor controller, includes an inverter including circuitry which supplies power to a motor, and a controller including circuitry which controls the inverter such that the circuitry of the inverter supplies an AC current to a first axis of a stationary orthogonal coordinate system in the motor while changing a frequency of the AC current. The first axis has a predetermined phase relationship with a phase voltage of the motor.

According to another aspect of the present disclosure, a motor controller includes an inverter including circuitry which supplies power to a motor, and a controller including circuitry which controls the inverter such that the circuitry of the inverter supplies an AC current to a first axis of a stationary orthogonal coordinate system in the motor. The first axis has a predetermined phase relationship with a phase voltage of the motor.

According to the other aspect of the present disclosure, a method for controlling a motor includes controlling an inverter using a controller including circuitry such that the inverter supplies an AC current to an axis of a stationary orthogonal coordinate system, and controlling the inverter using the controller including the circuitry such that the inverter changes a frequency of the AC current supplied from the inverter. The axis has a predetermined phase relationship with a phase voltage of the motor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
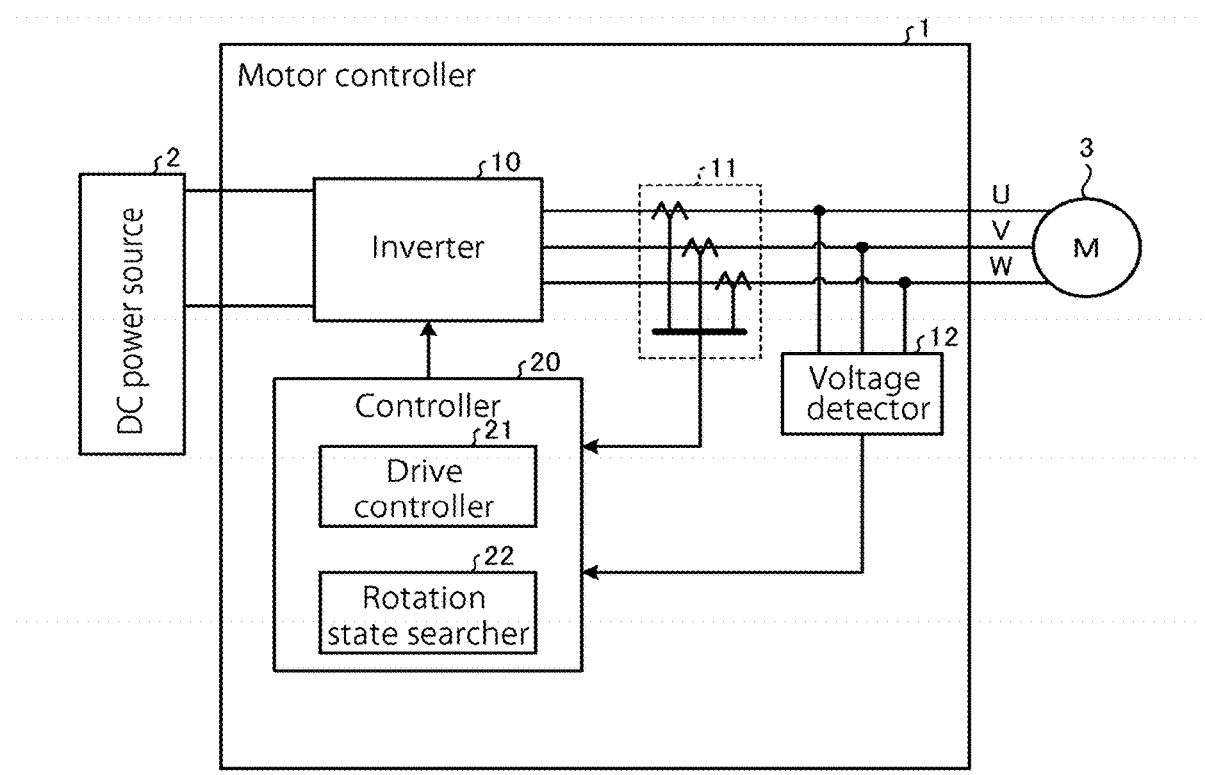
FIG. 1 is a diagram illustrating an exemplary configuration of a motor controller according to an embodiment.

The embodiments will now be described with reference to the accompanying drawings, wherein like reference numerals designate corresponding or identical elements throughout the various drawings.

1. Motor Controller

FIG. 1 is a diagram illustrating an exemplary configuration of a motor controller 1 according to this embodiment. As illustrated in FIG. 1, the motor controller 1 includes an inverter 10, a current detector 11, a voltage detector 12, and a controller 20. The motor controller 1 receives Direct-Current (DC) power supplied from a DC power source 2, converts the DC power into Alternating-Current (AC)

power, and outputs the AC power to a motor 3 so as to control the motor 3. A non-limiting example of the motor 3 is a three-phase induction motor.

While in FIG. 1 the motor controller 1 is disposed between the DC power source 2 and the motor 3, the motor controller 1 may be disposed between an AC power source and the motor 3. In this case, the motor controller 1 includes a converter that converts AC power supplied from the AC power source into DC power and that supplies the DC power to the inverter 10. In another possible embodiment, the inverter 10 may be replaced with a matrix converter that includes a plurality of bidirectional switches. In this case, the motor controller 1 may use the matrix converter to output AC directly from an AC input.

The inverter 10 includes a plurality of switching elements that are connected to each other in, for example, a three-phase bridge configuration. The current detector 11 detects current flowing to the motor 3 from the inverter 10 (this current will be hereinafter occasionally referred to as detected current $I_o$), and outputs the detected current $I_o$ to the controller 20. The voltage detector 12 detects the voltage of the motor 3 (this voltage will be hereinafter occasionally referred to as detected voltage $V_o$), and outputs the detected voltage $V_o$ to the controller 20.

The controller 20 includes a drive controller 21 and a rotation state searcher 22. The drive controller 21 generates a driving signal to drive the switching elements of the inverter 10 and outputs the driving signal to the inverter 10. The switching elements of the inverter 10 are PWM (Pulse Width Modulation) controlled by the driving signal output from the drive controller 21. This configuration ensures that the DC power supplied from the DC power source 2 is converted into AC power by the inverter 10, and the AC power is output to the motor 3. By the AC power, the motor 3 is controlled into rotation.

When power supply from a power source (for example, the DC power source 2) is discontinued due to, for example, an instantaneous power failure, the drive controller 21 discontinues power supply to the motor 3 from the inverter 10 by, for example, turning off all the switching elements of the inverter 10. After power failure recovery causing the power source to resume power supply, the drive controller 21 performs rotation state search processing and/or other processing and then controls the switching elements of the inverter 10 to control the motor 3 into rotation.

At re-start time of the motor 3, which is when the motor 3 resumes its rotation after free-run state caused by, for example, an instantaneous power failure, the rotation state searcher 22 performs rotation state search processing. In the rotation state search processing, the rotation state searcher 22 performs search to determine the rotational frequency $\omega_{ma}$ ($=|\omega_m|$) of the motor 3 and the rotation direction $D_m$ ($=\sin(\omega_m)$) of the motor 3.

As used herein, "$\omega_m$" refers to the rotational frequency of the motor 3 including the rotation direction $D_m$. As used herein, the rotational frequency $\omega_{ma}$ of the motor 3 refers to frequency in electrical angle terms; frequency in mechanical angle terms is based on the number of poles of the motor 3. In the following description, the motor 3 is a two-pole motor for convenience. This configuration, however, is not intended as limiting the number of poles of the motor 3.

In the rotation state search processing, the rotation state searcher 22 detects the rotational frequency $\omega_{ma}$ of the motor 3 and the rotation direction $D_m$ of the motor 3. The processing to detect the rotational frequency $\omega_{ma}$ of the motor 3 will be hereinafter referred to as rotational frequency search processing, and the processing to detect the rotation direction $D_m$ of the motor 3 will be hereinafter referred to as rotation direction search processing.

The rotation state search processing starts when power supply resumes after temporary suspension of power supply from the power source to the motor controller 1 due to, for example, an instantaneous power failure. For example, the controller 20 starts the rotation state search processing when DC power supply from the DC power source 2 to the motor controller 1 resumes after temporary suspension of the DC power supply.

In the possible embodiment where the motor controller 1 includes a converter to convert AC power from the AC power source into DC power, the controller 20 may start the rotation state search processing when AC power supply from the AC power source to the motor controller 1 resumes after temporary suspension of the AC power supply.

In the rotational frequency search processing, the rotation state searcher 22 controls the inverter 10 to supply AC current (hereinafter referred to as search current $I_s$) to a first axis of a stationary orthogonal coordinate system while changing the frequency, $\omega_s$, of the search current $I_s$. The first axis has a predetermined phase relationship with the phase voltage of the motor 3. The stationary orthogonal coordinate system is a coordinate system set for the stator of the motor 3 and is also referred to as stator coordinate system. The first axis that has a predetermined phase relationship with the phase voltage of the motor 3 is one of two orthogonal axes of the stationary orthogonal coordinate system. The predetermined phase relationship that the first axis has with the phase voltage of the motor 3 is a predetermined angle difference between the phase of the phase voltage of the motor 3 and the first axis of the stationary orthogonal coordinate system. The angle difference may be zero.

The search current $I_s$ excites the secondary flux of the motor 3. The secondary flux of the motor 3 rotates together with the rotation of the rotor of the motor 3. When a search current $I_s$ having a frequency $\omega_s$ identical to the rotational frequency $\omega_{ma}$ of the motor 3 is supplied to the motor 3, the secondary flux of the motor 3 and the induced voltage of the motor 3 are at their maximum.

In view of this, the rotation state searcher 22 detects the rotational frequency $\omega_{ma}$ of the motor 3 based on at least one of the voltage of the motor 3 and the flux of the motor 3 while the search current $I_s$ being supplied to the motor 3. This configuration enables detection of the rotational frequency $\omega_{ma}$ of the motor 3 even if there is no residual flux on the motor 3.

For example, the rotation state searcher 22 may determine, as the rotational frequency $\omega_{ma}$ of the motor 3, a frequency $\omega_s$ of the search current $I_s$ that corresponds to the time at which the voltage of the motor 3 is at its maximum. Alternatively, the rotation state searcher 22 may determine, as the rotational frequency $\omega_{ma}$ of the motor 3, a frequency $\omega_s$ of the search current $I_s$ at which the voltage of the motor 3 is equal to or higher than threshold voltage $V_{th}$.

The rotation state searcher 22 also detects the rotation direction $D_m$ of the motor 3 based on a voltage of the motor 3 caused by the search current $I_s$. This configuration enables detection of the rotation direction $D_m$ of the motor 3 even if there is no residual flux on the motor 3.

For example, the rotation state searcher 22 may calculate the voltage phase of the motor 3 based on the voltage of the motor 3, and detect the rotation direction $D_m$ of the motor 3 based on how the voltage phase is changing. Alternatively, the rotation state searcher 22 may detect the rotational frequency, $\omega_m$, of the motor 3 from, for example, the voltage phase of the motor 3, and detect the rotation direction $D_m$ of the motor 3 based on whether the rotational frequency $\omega_m$ is positive or negative.

The rotation state searcher 22 generates a current command $I_s^*$. The current command $I_s^*$ is based on the level of the search current $I_s$, which is to flow through the motor 3. Also, the rotation state searcher 22 generates a voltage command $V_s^*$. The voltage command $V_s^*$ is based on a difference between the detected current $I_o$ of the current detector 11 and the current command $I_s^*$. The drive controller 21 controls the switching elements of the inverter 10 based on the voltage command $V_s^*$ so as to supply to the motor 3 a voltage that is based on the voltage command $V_s^*$. This configuration ensures that the search current $I_s$ is supplied from the inverter 10 to the motor 3.

The rotation state searcher 22 may use the voltage command $V_s^*$ as the voltage of the motor 3 to detect the rotational frequency $\omega_{ma}$ and the rotation direction $D_m$. Specifically, the rotation state searcher 22 may detect the rotational frequency $\omega_{ma}$ of the motor 3 based on the voltage command $V_s^*$, and detect the rotation direction $D_m$ of the motor 3 based on the voltage command $V_s^*$.

The rotation state searcher 22 also may use the detected voltage $V_o$ of the voltage detector 12 as the voltage of the motor 3. That is, the rotation state searcher 22 may detect the rotational frequency $\omega_{ma}$ of the motor 3 based on the detected voltage $V_o$, and detect the rotation direction $D_m$ of the motor 3 based on the detected voltage $V_a$.

The motor controller 1 will be described in more detail below. In the following description, the voltage command $V_s^*$ is used as the voltage of the motor 3 to detect the rotational frequency $\omega_{ma}$ of the motor 3 and the rotation direction $D_m$ of the motor 3.

2. Exemplary Configuration of Motor Controller 1

Figure 2:
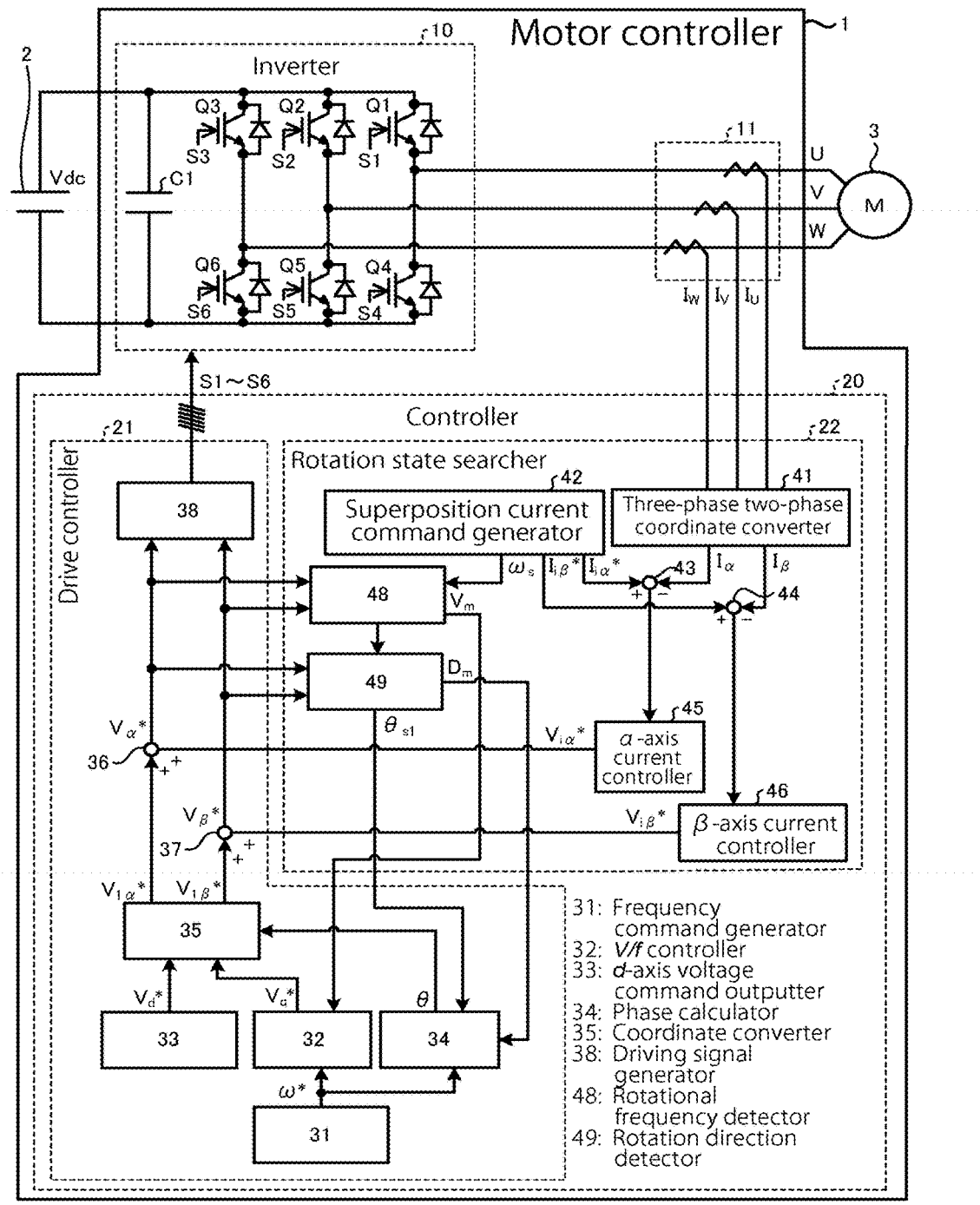
FIG. 2 is a diagram illustrating an exemplary configuration of the motor controller illustrated in FIG. 1.

FIG. 2 is a diagram illustrating an exemplary configuration of the motor controller illustrated in FIG. 1. As illustrated in FIG. 2, the motor controller 1 includes the inverter 10, the current detector 11, and the controller 20, and controls the motor 3. A non-limiting example of the motor 3 is a three-phase induction motor.

The inverter 10 includes a capacitor C1 and a plurality of switching elements Q1 to Q6. The switching elements Q1 to Q6 are connected to each other in a three-phase bridge configuration, and each of the switching elements Q1 to Q6 is anti-parallelly connected with a protection-purpose diode.

Examples of the switching elements Q1 to Q6 include, but are not limited to, semiconductor switching elements such as Metal-Oxide-Semiconductor Field-Effect Transistors (MOSFETs) and Insulated Gate Bipolar Transistors (IGBTs). The inverter 10 will not be limited to the configuration illustrated in FIG. 2; any other configuration capable of outputting AC power to drive the motor 3 is possible.

The current detector 11 detects instantaneous values $I_u$, $I_v$, and $I_w$, of the currents flowing from the inverter 10 to the U phase, the V phase, and the W phase of the motor 3 (these instantaneous values will be hereinafter referred to as detected currents $I_u$, $I_v$, and $I_w$). Then, the current detector 11 outputs the detected currents $I_u$, $I_v$, and $I_w$. In this embodiment, the current detector 11 includes a current transformer. In another possible embodiment, the current detector 11 may include a Hall element, which is a magnetoelectric conversion device.

In another possible embodiment, the current detector 11 may detect the currents of two phases, instead of three phases. For example, the current detector 11 may first detect the detected currents $I_u$ and $I_v$. Then, in order to obtain the detected current $I_w$, the current detector 11 may substitute the values of the detected currents $I_u$ and $I_v$ into operation formula "$I_w - I_u - I_v$". It is also possible to use the controller 20 to calculate the instantaneous value of the current of the third phase not detected by the current detector 11.

When the operation mode of the controller 20 is driving mode, the controller 20 generates driving signals S1 to S6 based on, for example, a speed command $\omega^*$. The driving signals S1 to S6 turn on and off the switching elements Q1 to Q6 of the inverter 10. Then, the controller 20 outputs the driving signals S1 to S6 to the inverter 10. This configuration ensures that the DC power supplied from the DC power source 2 is converted into AC power by the inverter 10, and the AC power is output to the motor 3. By the AC power, the motor 3 is controlled into rotation.

When the operation mode of the controller 20 is speed search mode, the controller 20 controls the inverter 10 to output search current $I_s$. Then, based on the voltage of the motor 3 obtained from this search current $I_s$, the controller 20 detects the rotational frequency $\omega_{ma}$ of the motor 3 and the rotation direction $D_m$ of the motor 3. The controller 20 will be described in detail below.

3. Controller 20

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program, and thus implements the control described later.

The controller 20 includes the drive controller 21 and the rotation state searcher 22. The functions of the drive controller 21 and the rotation state searcher 22 are implemented by, for example, the above-described CPU when the CPU reads and executes the program. Each of the drive controller 21 and the rotation state searcher 22 may partially or entirely be implemented by hardware such as Application Specific Integrated Circuit (ASIC) and Field Programmable Gate Array (FPGA).

3.1. Drive Controller 21

The drive controller 21 includes a frequency command generator 31, a V/f controller 32, a d-axis voltage command outputter 33, a phase calculator 34, a coordinate converter 35, adders 36 and 37, and a driving signal generator 38.

The frequency command generator 31 generates the speed command $\omega^*$ (which is a non-limiting example of the frequency command recited in the appended claims). The speed command $\omega^*$ is sent from the frequency command generator 31 to the V/f controller 32 and the phase calculator 34.

The V/f controller 32 outputs a q-axis voltage command $V_q^*$ based on the speed command $\omega^*$. The V/f controller 32 includes a table or a calculator that correlates the values of the speed command $\omega^*$ with the values of the q-axis voltage command $V_q^*$. Based on the table or the calculator, the V/f controller 32 outputs a value of the q-axis voltage command $V_q^*$ that is based on the speed command $\omega^*$.

The d-axis voltage command outputter 33 outputs a d-axis voltage command $V_d^*$. The d-axis voltage command $V_d^*$ is set at zero, for example. The phase calculator 34 generates a phase $\theta$ that is based on the speed command $\omega^*$. For example, the phase calculator 34 differentiates the speed command $\omega^*$ so as to obtain the phase $\theta$.

Based on the phase $\theta$, on the q-axis voltage command $V_q^*$, and on the d-axis voltage command $V_d^*$, the coordinate converter 35 calculates a α-axis voltage command $V_{1\alpha}^*$ and a β-axis voltage command $V_{1\beta}$. The α-axis voltage command $V_{1\alpha}^*$ is an α-axis component of an α-β axis coordinate system, and the β-axis voltage command $V_{1\beta}^*$ is a β-axis component of the α-β axis coordinate system.

The α-β axis coordinate system is a stationary orthogonal coordinate system whose axis has a predetermined phase relationship with the phase voltage of the motor 3. For example, the a axis and the U phase axis (U phase voltage phase) of the motor 3 are set to agree with each other. In another possible embodiment, the a axis of the α-β axis coordinate system agrees with the V phase axis (V phase voltage phase) of the motor 3, or the a axis agrees with the W phase axis (W phase voltage phase) of the motor 3. In still another possible embodiment, the α axis may not necessarily agree with any of the U phase axis, the V phase axis, and the W phase axis; instead, the α axis may be fixed at a convenient phase.

The coordinate converter 35 performs operations represented by, for example, Formulae (1) and (2) to obtain the phase $\theta_a$. Then, based on the phase $\theta_a$, the coordinate converter 35 converts the q-axis voltage command $V_q^*$ and the d-axis voltage command $V_d^*$ respectively into the α-axis voltage command $V_{1\alpha}^*$ and the β-axis voltage command $V_{1\beta}^*$.

$$\theta_v = \tan^{-1}(V_q^*/V_d^*) \quad (1)$$

$$\theta_a = \theta + \theta_v \quad (2)$$

The adder 36 adds the α-axis superposition voltage command $V_{i\alpha}^*$ generated by the rotation state searcher 22 to the α-axis voltage command $V_{1\alpha}^*$ so as to obtain an α-axis voltage command $V_\alpha^*$. The adder 37 adds the β-axis superposition voltage command $V_{i\beta}^*$ generated by the rotation state searcher 22 to the β-axis voltage command $V_{1\beta}^*$ so as to obtain a β-axis voltage command $V_\beta^*$.

The driving signal generator 38 generates the driving signals S1 to S6 based on the α-axis voltage command $V_\alpha^*$ and the β-axis voltage command $V_\beta^*$. For example, the driving signal generator 38 performs three-phase/two-phase conversion to convert the α-axis voltage command $V_\alpha^*$ and the β-axis voltage command $V_\beta^*$ into a U phase voltage command $V_{u^*}$, a V phase voltage command $V_{v^*}$, and a W phase voltage command $V_{w^*}$. Then, the driving signal generator 38 compares a carrier signal with the U phase voltage command $V_{u^*}$, the V phase voltage command $V_{v^*}$, and the W phase voltage command $V_{w^*}$ so as to obtain a PWM signal. Then, the driving signal generator 38 uses the PWM signal to generate the driving signals S1 to S6.

3.2. Rotation State Searcher 22

When the operation mode of the controller 20 is speed search mode, the rotation state searcher 22 causes the inverter 10 to supply the search current $I_s$ to one axis (α-axis or β-axis) of the α-β axis coordinate system so as to detect the rotational frequency $\omega_{ma}$ of the motor 3 and the rotation direction $D_m$ of the motor 3.

The rotation state searcher 22 includes a three-phase two-phase coordinate converter 41, a superposition current command generator 42, subtractors 43 and 44, a α-axis current controller 45, a β-axis current controller 46, a rotational frequency detector 48, and a rotation direction detector 49.

The three-phase two-phase coordinate converter 41 performs three-phase/two-phase coordinate conversion to convert the detected currents $I_u$, $I_v$, and $I_w$ respectively of the U phase, the V phase, and the W phase into an α-axis detected current $I_\alpha$ and a β-axis detect current $I_\beta$. The α-axis detected current $I_\alpha$ is an α-axis component of an α-β axis coordinate system, and the β-axis detect current $I_\beta$ is a β-axis component of the α-β axis coordinate system.

The superposition current command generator 42 generates a α-axis superposition current command $I_{i\alpha}^*$ and a β-axis superposition current command $I_{i\beta}^*$. For example, the superposition current command generator 42 perform is an operation represented by, for example, Formula (3) to generate the α-axis superposition current command $I_{i\alpha}^*$. In this case, the superposition current command generator 42 sets $I_{i\beta}^*$ at zero, for example ($I_{i\beta}^*=0$). In Formula (3), $I_o$ and $I_{max}$ are set to have the relationship: $I_o \geq I_{max}$, for example "$I_{max}$" is rated output current of the motor controller 1, for example.

$$I_{i\alpha}^* = I_o \sin(\omega_s t) \quad (3)$$

The α-axis superposition current command $I_{i\alpha}^*$ resulting from the operation of Formula (3) is a sinusoidal signal. In another possible embodiment, the α-axis superposition current command $I_{i\alpha}^*$ may be a pulse signal or a triangular wave signal (such as a sawtooth wave signal) that has a frequency of $\omega_s$. That is, the α-axis superposition current command $I_{i\alpha}^*$ may be any signal that has a frequency of $\omega_s$. A pulse signal and a triangular wave signal, however, each contain many other frequency components than the frequency $\omega_s$. In view of the accuracy of detecting the rotational frequency $\omega_{ma}$ of the motor 3 and the rotation direction $D_m$ of the motor 3, the α-axis superposition current command $I_{i\alpha}^*$ is preferably a sinusoidal signal rather than a pulse signal and a triangular wave signal.

In the above-described example, the α-axis superposition current command $I_{i\alpha}^*$ is an AC signal and the β-axis superposition current command $I_{i\beta}^*$ is set at zero. In another possible embodiment, the β-axis superposition current command $I_{i\beta}^*$ may be an AC signal and the α-axis superposition current command $I_{i\alpha}^*$ may be set at zero. That is, the superposition current command generator 42 may set $I_{i\beta}^*$ at $I_o \sin(\omega_s t)$ and set $I_{i\alpha}^*$ at zero.

In this embodiment, both the α-axis superposition current command $I_{i\alpha}^*$ and the β-axis superposition current command $I_{i\beta}^*$ are zero. In another possible embodiment, one of $I_{i\alpha}^*$ and $I_{i\beta}^*$ may be a non-zero, small value that least influences the detection of the rotational frequency $\omega_{ma}$ and the rotation direction $D_m$.

The subtractor 43 subtracts the α-axis detected current $I_\alpha$ from the α-axis superposition current command $I_{i\alpha}^*$. The α-axis current controller 45 generates the α-axis superposition voltage command $V_{i\alpha}^*$ so as to make smaller the difference between the α-axis superposition current command $I_{i\alpha}^*$ and the α-axis detected current $I_\alpha$. For example, the α-axis current controller 45 performs Proportional Integration (PI) control to make zero error between the α-axis superposition current command $I_{i\alpha}^*$ and the α-axis detected current $I_\alpha$, so as to generate α-axis superposition voltage command $V_{i\alpha}^*$.

By the α-axis superposition voltage command $V_{i\alpha}^*$, a value of α-axis current $i_\alpha$ that is based on the α-axis superposition current command $I_{i\alpha}^*$ is supplied from the inverter 10 to the motor 3. Then, a value of the α-axis detected current $I_\alpha$ that is based on the α-axis superposition current command $I_{i\alpha}^*$ is detected by the current detector 11. In another possible embodiment, the α-axis current controller 45 may perform Proportional (P) control or Proportional Integration Differentiation (PID) control, instead of PI control.

The subtractor 44 subtracts the β-axis detect current $I_\beta$ from the β-axis superposition current command $I_{i\beta}^*$. The β-axis current controller 46 generates β-axis superposition voltage command $V_{i\beta}^*$ so as to make smaller the difference between the β-axis superposition current command $I_{i\beta}^*$ and the β-axis detect current $I_β$. For example, the β-axis current controller 46 performs PI control to make zero error between the β-axis superposition current command $I_{iβ}^*$ and the β-axis detect current $I_β$, so as to generate β-axis superposition voltage command $V_{iβ}$.

By the β-axis superposition voltage command $V_{iβ}$, a value of β-axis current iβ that is based on the β-axis superposition current command $I_{iβ}^*$ is supplied from the inverter 10 to the motor 3. Then, a value of the β-axis detect current $I_β$ that is based on the β-axis superposition current command $I_{iβ}^*$ is detected by the current detector 11. In another possible embodiment, the β-axis current controller 46 may perform P control or PID control, instead of PI control.

As described above, the drive controller 21 adds the α-axis superposition voltage command $V_{iα}^*$ to the α-axis voltage command $V_{1α}^*$. In this manner, the α-axis superposition voltage command $V_{iα}^*$ is superposed onto the α-axis voltage command $V_{1α}^*$. Also as described above, the drive controller 21 adds the β-axis superposition voltage command $V_{iβ}^*$ to the β-axis voltage command $V_{1β}^*$. In this manner, the β-axis superposition voltage command $V_{iβ}^*$ is superposed onto the β-axis voltage command $V_{iβ}^*$. When the operation mode of the controller 20 is speed search mode, $V_{1α}^*=0$ and $V_{1β}^*=0$, for example. In this case, the α-axis voltage command $V_α^*$ and the β-axis voltage command $V_β^*$ are examples of the above-described voltage command $V_s^*$.

At the α-axis superposition voltage command $V_{iα}^*$ and the β-axis superposition voltage command $V_{iβ}^*$, the search current $I_s$ is supplied from the inverter 10 to the motor 3. The search current $I_s$ contains the α-axis current $i_α$, which is an α-axis component, and the β-axis current iβ. When $I_{iα}^*=I_o \sin(ω_s t)$ and $I_{iβ}^*=0$, the search current $I_s$ is adjusted by the α-axis superposition voltage command $V_{iα}^*$ and the β-axis superposition voltage command $V_{iβ}^*$ so that $i_α=I_o \sin(ω_s t)$ and iβ=0, for example. This configuration ensures that the search current $I_s$ flows to the α-axis.

When P control is performed at the α-axis current controller 45 and the β-axis current controller 46, the β-axis current iβ may not occasionally be controlled to be zero. Even in this case, most of the search current $I_s$ flows to the α-axis with the β-axis current iβ being eliminated or minimized.

Making $I_{iα}^*=0$ and $I_{iβ}^*=I_o \sin(ω_s t)$ also enables the search current $I_s$ to flow to the β-axis. This configuration ensures that the search current $I_s$ is supplied to one of the axes of the α-β axis coordinate system. As a result, the rotational frequency $ω_{ma}$ of the motor 3 and the rotation direction $D_m$ of the motor 3 are detected with improved accuracy.

In the embodiment illustrated in FIG. 2, the drive controller 21 adds the α-axis superposition voltage command $V_{iα}^*$ to the α-axis voltage command $V_{1α}^*$, and adds the β-axis superposition voltage command $V_{iβ}^*$ to the β-axis voltage command $V_{1β}^*$. The drive controller 21, however, will not be limited to the configuration illustrated in FIG. 2.

Figure 3:
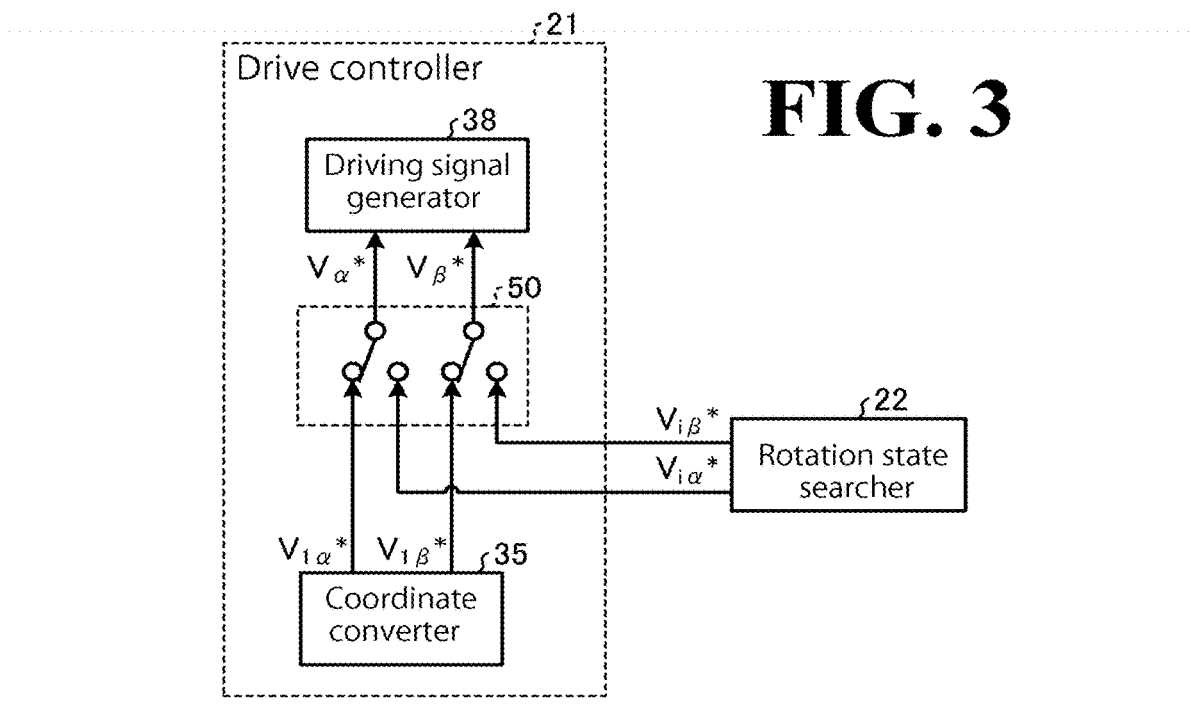
FIG. 3 is a diagram illustrating another configuration of a drive controller.

FIG. 3 is a diagram illustrating another configuration of the drive controller 21. The drive controller 21 illustrated in FIG. 3 includes a switch 50, instead of the adders 36 and 37 (see FIG. 2). The switch 50 switches between the α-axis superposition voltage command $V_{iα}^*$ and the α-axis voltage command $V_{1α}^*$ to output the α-axis voltage command $V_α^*$. The switch 50 also switches between the β-axis superposition voltage command $V_{iβ}^*$ and the β-axis voltage command $V_{1β}^*$ to output the β-axis voltage command Vβ*.

The drive controller 21 is also capable of switching between "$V_{iα}^*, V_{iβ}^*$" and "$V_{1α}^*, V_{1β}^*$" to output the α-axis voltage command $V_α^*$ and the β-axis voltage command $V_β^*$. The α-axis superposition voltage command $V_{iα}^*$ and the β-axis superposition voltage command $V_{iβ}^*$ will occasionally collectively be referred to as superposition voltage command $V_i$.

Figure 4:
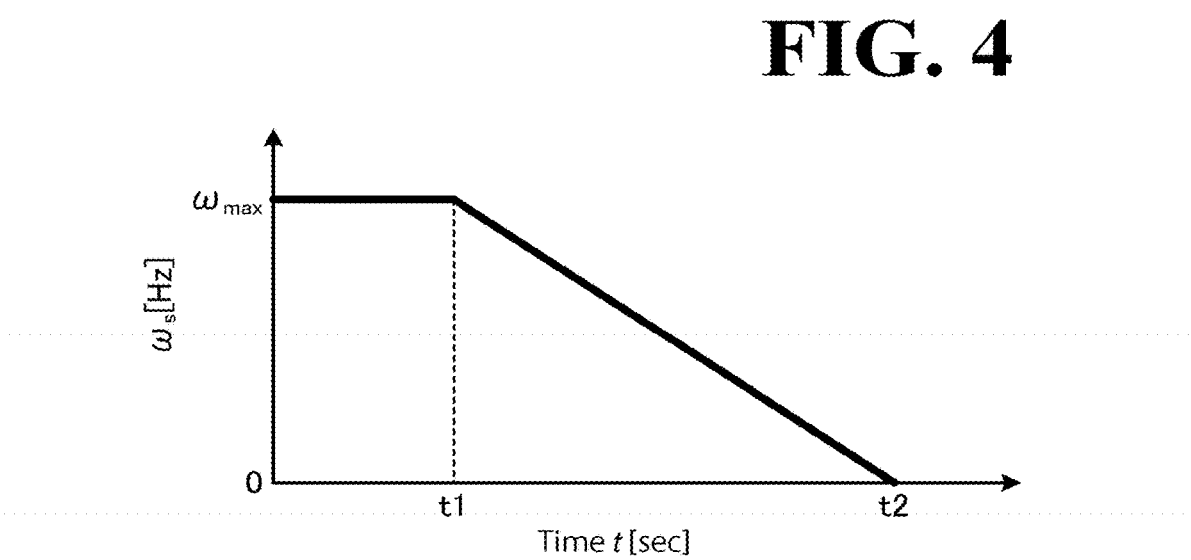
FIG. 4 illustrates how the frequency of $\alpha$-axis superposition current command is changing.

The superposition current command generator 42 will be described in more detail below. FIG. 4 illustrates how the frequency $ω_s$ of the α-axis superposition current command $I_{iα}^*$ are changing. As illustrated in FIG. 4, in speed search mode, the superposition current command generator 42 first generates a α-axis superposition current command $I_{iα}^*$ having a frequency $ω_s$ of $ω_{max}$. Then, the superposition current command generator 42 generates a α-axis superposition current command $I_{iα}^*$ whose frequency $ω_s$ gradually becomes smaller from time t1 to time t2.

Figure 5:
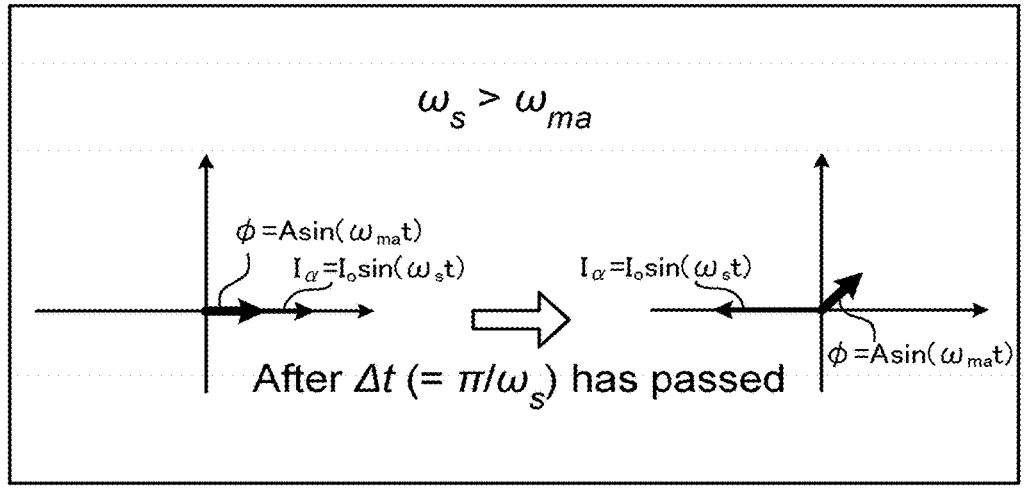
FIG. 5 is a first illustration of how a secondary flux of a motor and $\alpha$-axis current are changing.
Figure 6:
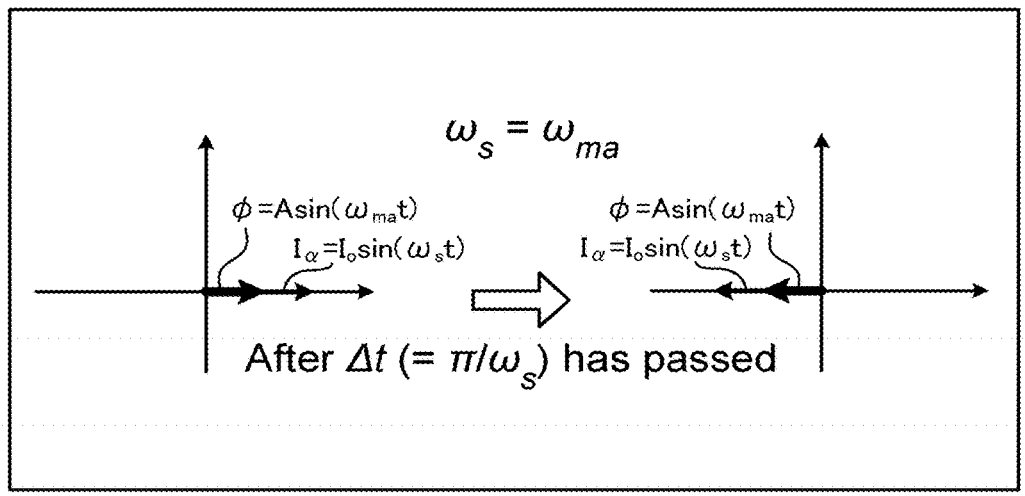
FIG. 6 is a second illustration of how the secondary flux of the motor and the $\alpha$-axis current are changing.

FIG. 5 illustrates an example of how the secondary flux φ of the motor 3 and the α-axis current $i_α$ change in the case of $ω_s>ω_{ma}$. FIG. 6 illustrates an example of how the secondary flux φ of the motor 3 and the α-axis current $i_α$ are changing in the case of $ω_s=ω_{ma}$. It is noted that $I_α=i_α$, and $I_β=iβ$. In the embodiment illustrated in FIGS. 5 and 6, α-axis detected current $I_α$ and β-axis detect current $I_β$ respectively corresponding to the α-axis current $i_α$ and the β-axis current iβ are illustrated.

In the case of $ω_s>ω_{ma}$, as illustrated in the left part of FIG. 5, the secondary flux φ and the α-axis current $i_α$ are oriented in the positive direction of the α-axis. After $Δt(=π/ω_s)$ has passed, as illustrated in the right part of FIG. 5, the α-axis current $i_α$ is ahead by π, and the secondary flux φ lags behind the α-axis current $i_α$.

In the case of $ω_s=ω_{ma}$, as illustrated in the left part of FIG. 6, the secondary flux φ and the α-axis current $i_α$ are oriented in the positive direction of the α-axis. After $Δt(=π/ω_s)$ has passed, as illustrated in the right part of FIG. 6, both the α-axis current $i_α$ and the secondary flux φ are ahead by π. In this case, the secondary flux φ of the motor 3 increases (amplifies), causing the induced voltage of the motor 3 to increase.

Figure 7:
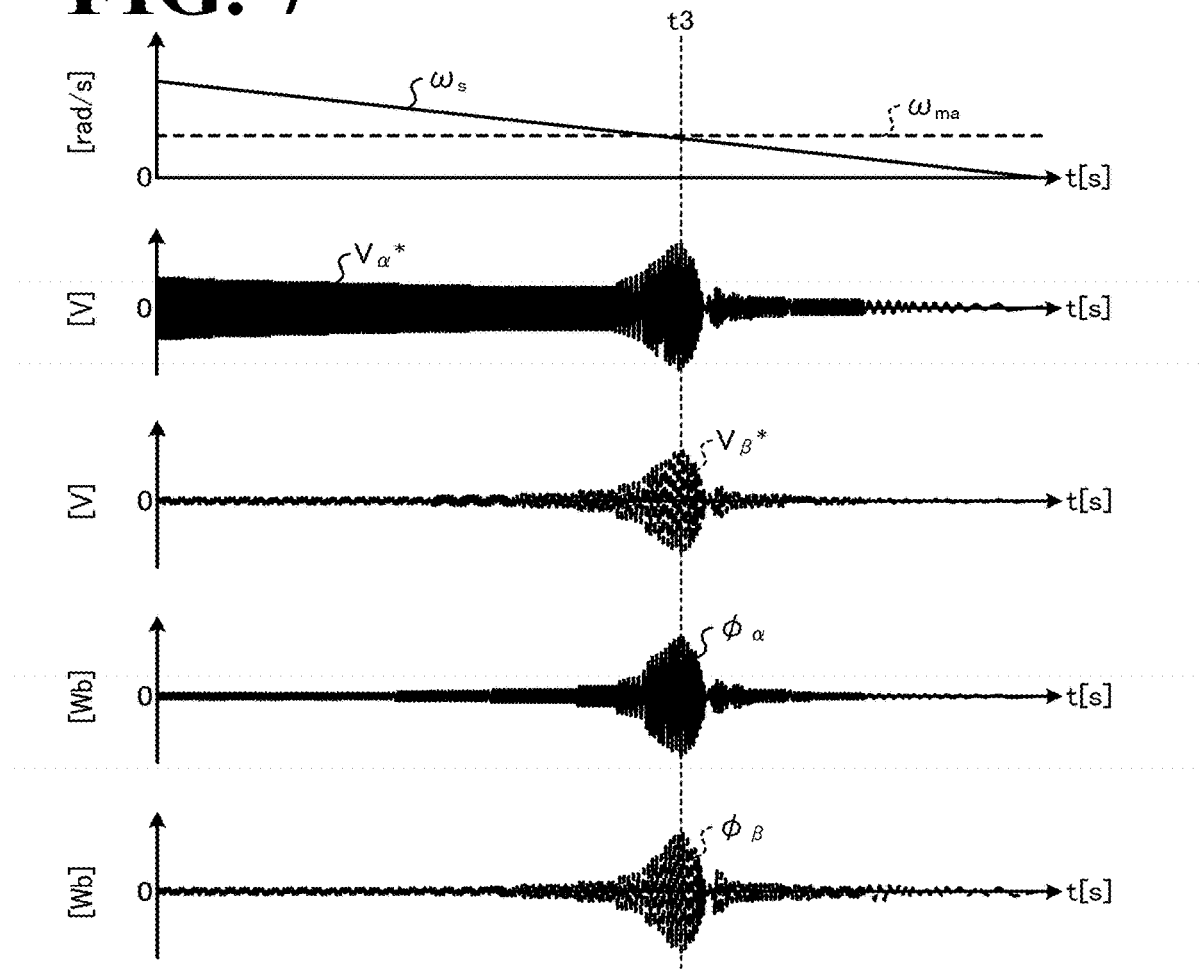
FIG. 7 illustrates how the rotational frequency of the motor, the frequency of search current, $\alpha$-axis voltage command, $\beta$-axis voltage command, $\alpha$-axis flux, and $\beta$-axis flux are changing.

FIG. 7 illustrates how the rotational frequency $ω_{ma}$ of the motor 3, the frequency $ω_s$ of the search current $I_s$, the α-axis voltage command $V_α^*$, the β-axis voltage command $V_β^*$, α-axis flux $φ_α$, and β-axis flux $φ_β$ are changing when the operation mode of the controller 20 is speed search mode. As illustrated in FIG. 7, when the rotational frequency $ω_{ma}$ of the motor 3 meets the frequency $ω_s$ of the search current $I_s$ (which is time t3 illustrated in FIG. 7), the α-axis voltage command $V_α^*$, the β-axis voltage command $V_β^*$, the α-axis flux $φ_α$, and the β-axis flux $φ_β$ are at their maximum. Here, $V_α^*=V_{iα}^*$, and $V_β^*=V_{iβ}^*$, for example.

In view of this situation, when the operation mode of the controller 20 is speed search mode, the rotational frequency detector 48 detects the rotational frequency $ω_{ma}$ of the motor 3 based on the voltage of the motor 3. For example, the rotational frequency detector 48 illustrated in FIG. 2 uses the α-axis voltage command $V_α^*$ and the β-axis voltage command $V_β^*$ as the voltage of the motor 3 to detect the rotational frequency $ω_{ma}$ of the motor 3.

Figure 8:
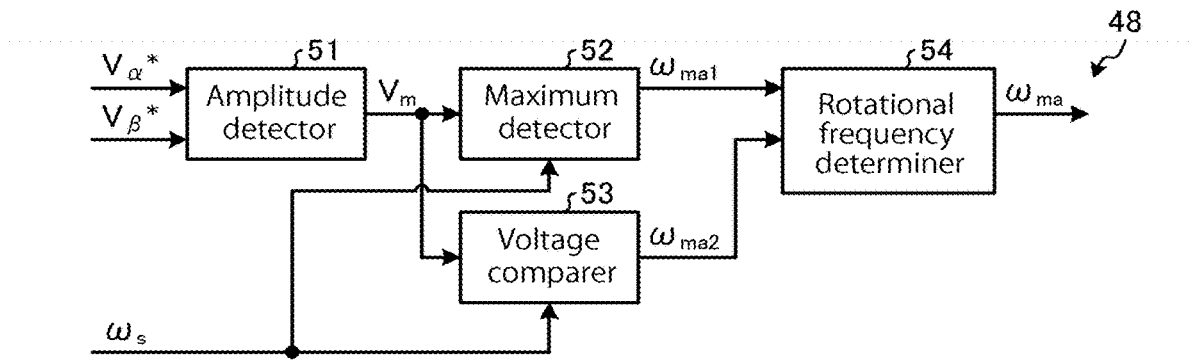
FIG. 8 is a diagram illustrating an example of a rotational frequency detector illustrated in FIG. 2.

FIG. 8 is a diagram illustrating an example of the rotational frequency detector 48. As illustrated in FIG. 8, the rotational frequency detector 48 includes an amplitude detector 51, a maximum detector 52, a voltage comparer 53, and a rotational frequency determiner 54.

The amplitude detector 51 detects the voltage amplitude, $V_m$, of the motor 3. Based on the α-axis voltage command $V_α^*$ and the β-axis voltage command $V_β^*$, the amplitude detector 51 performs an operation represented by, for example, Formula (4) to obtain the voltage amplitude $V_m$ of the motor 3.

$$V_m = \sqrt{(V_\alpha^{*2} + V_\beta^{*2})} \quad (4)$$

The maximum detector 52 detects a maximum value of the voltage amplitude $V_m$ calculated by the amplitude detector 51 while the frequency $\omega_s$ of the α-axis superposition current command $I_{i\alpha}^*$ is changing. In the embodiment illustrated in FIG. 7, the maximum value of the voltage amplitude $V_m$ is at time t3.

In another possible embodiment, the maximum detector 52 may detect the maximum value of the voltage of one of the α-axis voltage command $V_\alpha^*$ and the β-axis voltage command $V_\beta^*$.

In another possible embodiment, the maximum detector 52 may include a secondary flux observer. In this case, the secondary flux observer of the maximum detector 52 may estimate the secondary flux $\phi$ based on, for example, the α-axis voltage command $V_\alpha^*$, the β-axis voltage command $V_\beta^*$, the α-axis detected current $I_\alpha$, and the β-axis detect current $I_\beta$. Then, the maximum detector 52 may detect the maximum value of the secondary flux $\phi$ estimated by the secondary flux observer. The secondary flux observer can be implemented by a known technique and may have any configuration insofar as the secondary flux $\phi$ is estimated.

The maximum detector 52 determines, as rotational frequency $\omega_{ma1}$, a value of the frequency $\omega_s$ of the search current $I_s$ that maximizes the detection target (for example, at least one of the voltage amplitude $V_m$, the secondary flux $\phi$, the α-axis voltage command $V_\alpha^*$, and the β-axis voltage command $V_\beta^*$).

Figure 9:
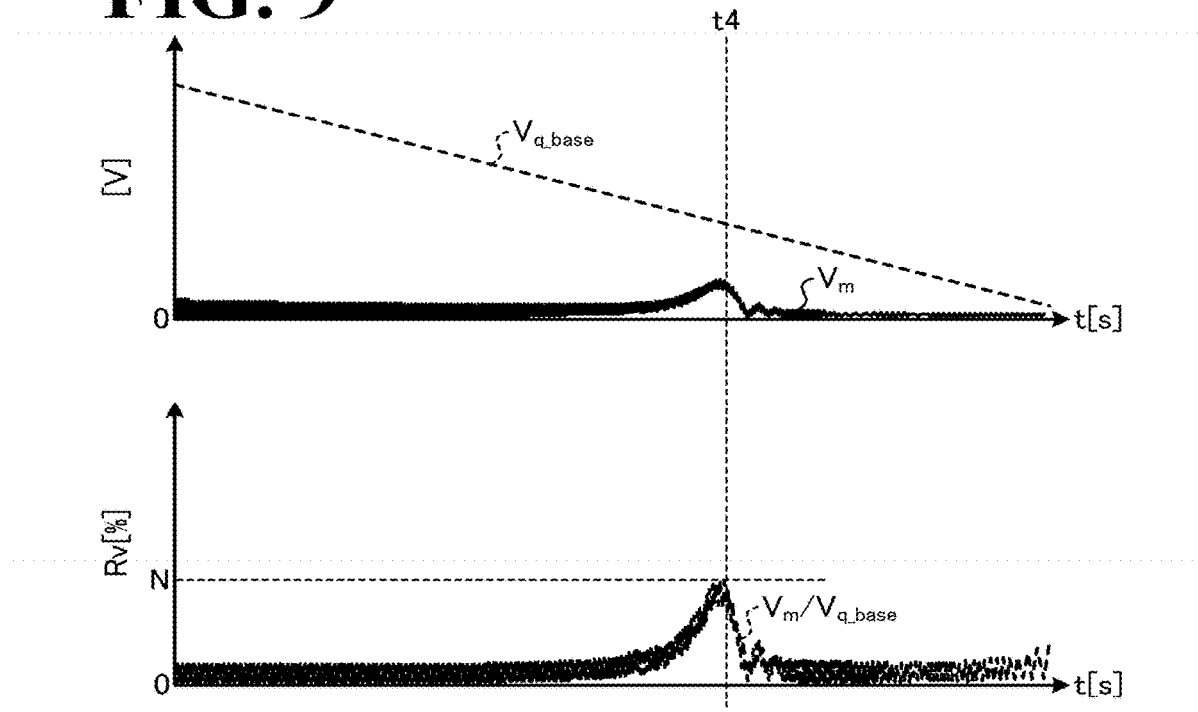
FIG. 9 illustrates a relationship among induced voltage at rated flux time, voltage amplitude, and a ratio of the voltage amplitude to the induced voltage.

The voltage comparer 53 determines, as rotational frequency $\omega_{ma2}$, a value of the frequency $\omega_s$ of the search current $I_s$ that makes the voltage amplitude $V_m$ equal to or higher than the voltage corresponding to the frequency $\omega_s$ of the search current $I_s$. FIG. 9 illustrates a relationship among induced voltage $V_{q\_base}$ at rated flux time, the voltage amplitude $V_m$, and a ratio $R_v$ of the voltage amplitude $V_m$ to the induced voltage $V_{q\_base}$ (this ratio will be hereinafter referred to as amplitude ratio $R_v$). With the rated flux assumed as $\phi_{rate}$, the induced voltage $V_{q\_base}$ can be obtained by, for example, operation formula "$V_{q\_base} = \omega_s \times \phi_{rate}$".

As the frequency $\omega_s$ of the search current $I_s$ becomes lower, the induced voltage $V_{q\_base}$ at rated flux time becomes lower, as illustrated in FIG. 9. When the frequency $\omega_s$ of the search current $I_s$ lowers to where $\omega_s = \omega_{ma}$ (which is time t4 illustrated in FIG. 9), the voltage amplitude $V_m$ is at its maximum and the amplitude ratio $R_v$ is at its maximum. The voltage comparer 53 compares, for example, the threshold, $R_{th}$, of the amplitude ratio $R_v$ with the amplitude ratio $R_v$ ($=V_m/V_{q\_base}$) to determine, as the rotational frequency $\omega_{ma2}$, a value of the frequency $\omega_s$ of the search current $I_s$ at which $R_v \geq R_{th}$.

The voltage comparer 53 may also include a secondary flux observer, similarly to the maximum detector 52. Then, the voltage comparer 53 may determine, as the rotational frequency $\omega_{ma2}$, a value of the frequency $\omega_s$ of the search current $I_s$ at which the secondary flux $\phi$ of the motor 3 estimated by the secondary flux observer is equal to or higher than the threshold $\phi_{th}$. The threshold $\phi_{th}$ may be a threshold that is based on the frequency $\omega_s$ of the search current $I_s$.

The rotational frequency determiner 54 determines, as the rotational frequency $\omega_{ma}$ of the motor 3, one of the rotational frequency $\omega_{ma1}$ detected by the maximum detector 52 and the rotational frequency $\omega_{ma2}$ detected by the voltage comparer 53. Whether to use the rotational frequency $\omega_{ma1}$ detected by the maximum detector 52 or the rotational frequency $\omega_{ma2}$ detected by the voltage comparer 53 is determined by, for example, a predetermined parameter.

In another possible embodiment, the rotational frequency determiner 54 may give priority to the rotational frequency $\omega_{ma1}$ over the rotational frequency $\omega_{ma2}$, and output the rotational frequency $\omega_{ma1}$ as the rotational frequency $\omega_{ma}$ of the motor 3. In still another possible embodiment, the rotational frequency determiner 54 may stop operation of one of the maximum detector 52 and the voltage comparer 53 according to a parameter set to cause the rotational frequency determiner 54 to do so. In still another possible embodiment, the rotational frequency determiner 54 may determine, as the rotational frequency $\omega_{ma}$ of the motor 3, an average value of the rotational frequency $\omega_{ma1}$ and the rotational frequency $\omega_{ma2}$.

Referring again to FIG. 2, the rotation state searcher 22 will be further described. The rotation direction detector 49 of the rotation state searcher 22 detects the rotation direction $D_m$ of the motor 3 based on the voltage of the motor 3 caused by the search current $I_s$. The rotation direction detector 49 uses the α-axis voltage command $V_\alpha^*$ and the β-axis voltage command $V_\beta^*$ as the voltage of the motor 3 to detect the rotation direction $D_m$ of the motor 3.

In another possible embodiment, while a search current $I_s$ having a frequency $\omega_s$ identical to the detected rotational frequency $\omega_{ma}$ is being supplied from the inverter 10 to the motor 3, the rotation direction detector 49 may detect the rotation direction $D_m$ of the motor 3 based on the α-axis voltage command $V_\alpha^*$ and the β-axis voltage command $V_\beta^*$. In this case, the α-axis current controller 45 and the β-axis current controller 46 keep outputting the α-axis superposition voltage command $V_{i\alpha}^*$ and the β-axis superposition voltage command $V_{i\beta}^*$ even after the rotational frequency detector 48 has detected the rotational frequency $\omega_{ma}$ of the motor 3.

In another possible embodiment, the rotation direction detector 49 may detect the rotation direction $D_m$ of the motor 3 based on the phase difference between the α-axis voltage command $V_\alpha^*$ and the β-axis voltage command $V_\beta^*$. For example, when the β-axis voltage command $V_\beta^*$ is 90 degrees ahead of the α-axis voltage command $V_\alpha^*$, the rotation direction detector 49 may determine the rotation direction $D_m$ of the motor 3 as normal direction. When the β-axis voltage command $V_\beta^*$ is 90 degrees behind the α-axis voltage command $V_\alpha^*$, the rotation direction detector 49 may determine the rotation direction $D_m$ of the motor 3 as reverse direction.

Figure 10:
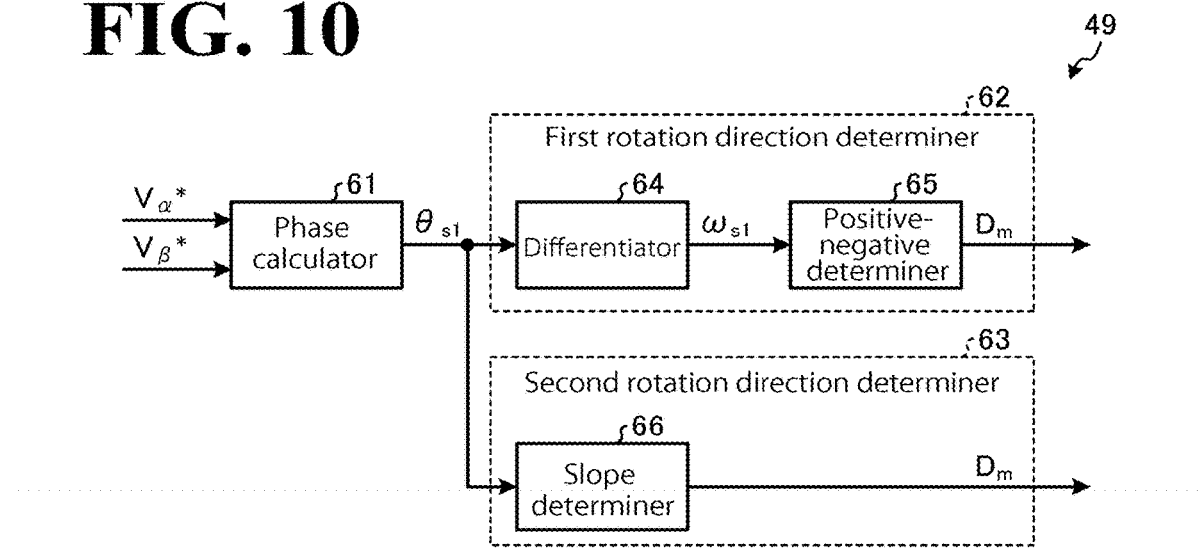
FIG. 10 is a diagram illustrating an example of a rotation direction detector illustrated in FIG. 2.

FIG. 10 is a diagram illustrating an example of the rotation direction detector 49. As illustrated in FIG. 10, the rotation direction detector 49 includes a phase calculator 61, a first rotation direction determiner 62, and a second rotation direction determiner 63.

The phase calculator 61 calculates the voltage phase, $\theta_{s1}$, of the motor 3 based on the α-axis voltage command $V_\alpha^*$ and the β-axis voltage command $V_\beta^*$. The phase calculator 61 performs an operation represented by, for example, Formula (5) to obtain the voltage phase $\theta_{s1}$.

$$\theta_{s1} = \tan^{-1}(V_\beta^*/V_\alpha^*) \quad (5)$$

The first rotation direction determiner 62 includes a differentiator 64 and a positive-negative determiner 65. The differentiator 64 differentiates the voltage phase $\theta_{s1}$ to obtain voltage frequency $\omega_{s1}$. The positive-negative determiner 65 determines whether the voltage frequency $\omega_{s1}$ is positive or negative so as to detect the rotation direction $D_m$ of the motor 3.

When, for example, $\omega_{s1}>0$, the positive-negative determiner 65 determines the rotation direction $D_m$ of the motor 3 as normal direction. When $\omega_{s1}<0$, the positive-negative determiner 65 determines the rotation direction $D_m$ of the motor 3 as reverse rotation. When the rotation direction $D_m$ of the motor 3 is normal direction, the positive-negative determiner 65 makes $D_m$ 1 ($D_m=1$), for example. When the rotation direction $D_m$ of the motor 3 is reverse rotation, the positive-negative determiner 65 makes $D_m$ "−1" ($D_m=-1$), for example.

The second rotation direction determiner 63 includes a slope determiner 66. The slope determiner 66 detects the rotation direction $D_m$ of the motor 3 based on how the voltage phase $\theta_{s1}$ of the motor 3 calculated by the phase calculator 61 is changing.

Figure 11:
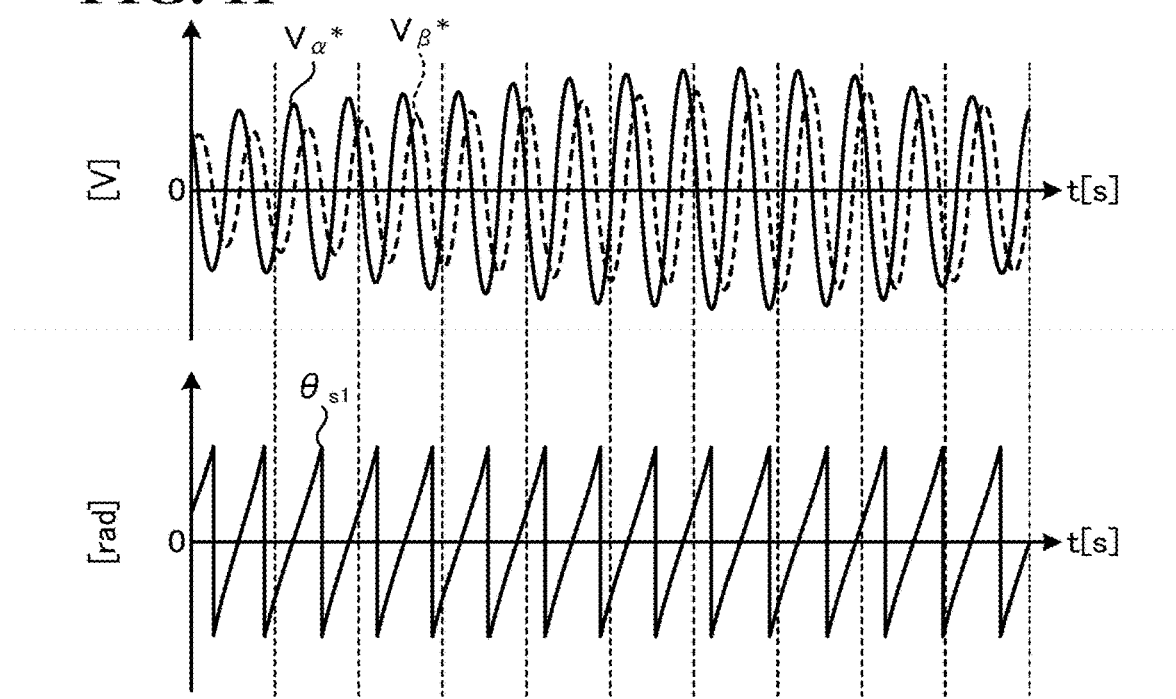
FIG. 11 illustrates the $\alpha$-axis voltage command, a state of the $\beta$-axis voltage command, and a state of voltage phase in a case where the rotation direction of the motor is normal direction.
Figure 12:
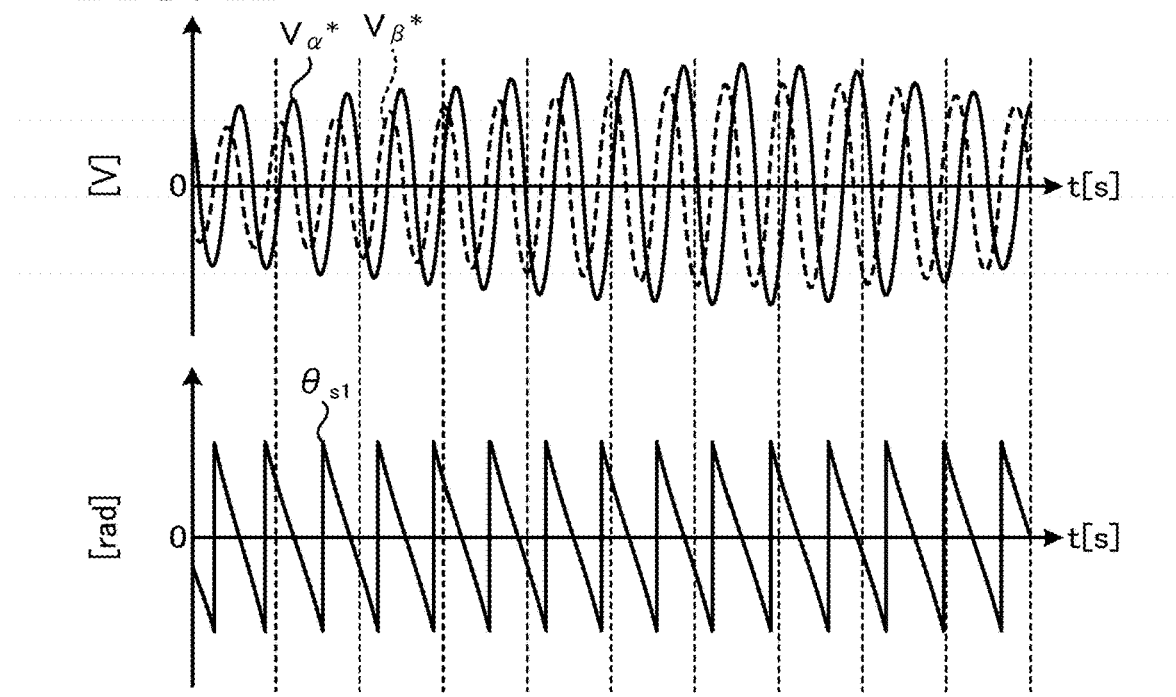
FIG. 12 illustrates the $\alpha$-axis voltage command, a state of the $\beta$-axis voltage command, and a state of the voltage phase in a case where the rotation direction of the motor is reverse direction.

FIG. 11 illustrates the α-axis voltage command $V_\alpha^*$, the β-axis voltage command $V_\beta^*$, and the voltage phase $\theta_{s1}$ in a case where the rotation direction $D_m$ of the motor 3 is normal direction. FIG. 12 illustrates the α-axis voltage command $V_\alpha^*$, the β-axis voltage command $V_\beta^*$, and the voltage phase $\theta_{s1}$ in a case where the rotation direction $D_m$ of the motor 3 is reverse direction.

As illustrated in FIG. 11, when the rotation direction $D_m$ of the motor 3 is normal direction, how the voltage phase $\theta_{s1}$ is changing can be described as forming a waveform made up of incremental slopes of gradually increasing values. When the rotation direction $D_m$ of the motor 3 is normal direction, as illustrated in FIG. 12, how the voltage phase $\theta_{s1}$ is changing can be described as forming a waveform made up of decremental slopes of gradually decreasing values.

In the case of the waveform of incremental slopes, the slope determiner 66 determines the rotation direction $D_m$ of the motor 3 as normal direction. In the case of the waveform of decremental slopes, the slope determiner 66 determines the rotation direction $D_m$ of the motor 3 as reverse direction.

The rotation direction detector 49 outputs the rotation direction $D_m$ of the motor 3 detected by one of the first rotation direction determiner 62 and the second rotation direction determiner 63.

Whether to use the rotation direction $D_m$ detected by the first rotation direction determiner 62 or the rotation direction $D_m$ detected by the second rotation direction determiner 63 is determined by, for example, a predetermined parameter. In another possible embodiment, the rotation direction detector 49 may stop operation of one of the first rotation direction determiner 62 and the second rotation direction determiner 63 according to a parameter set to cause the rotation direction detector 49 to do so.

Figure 13:
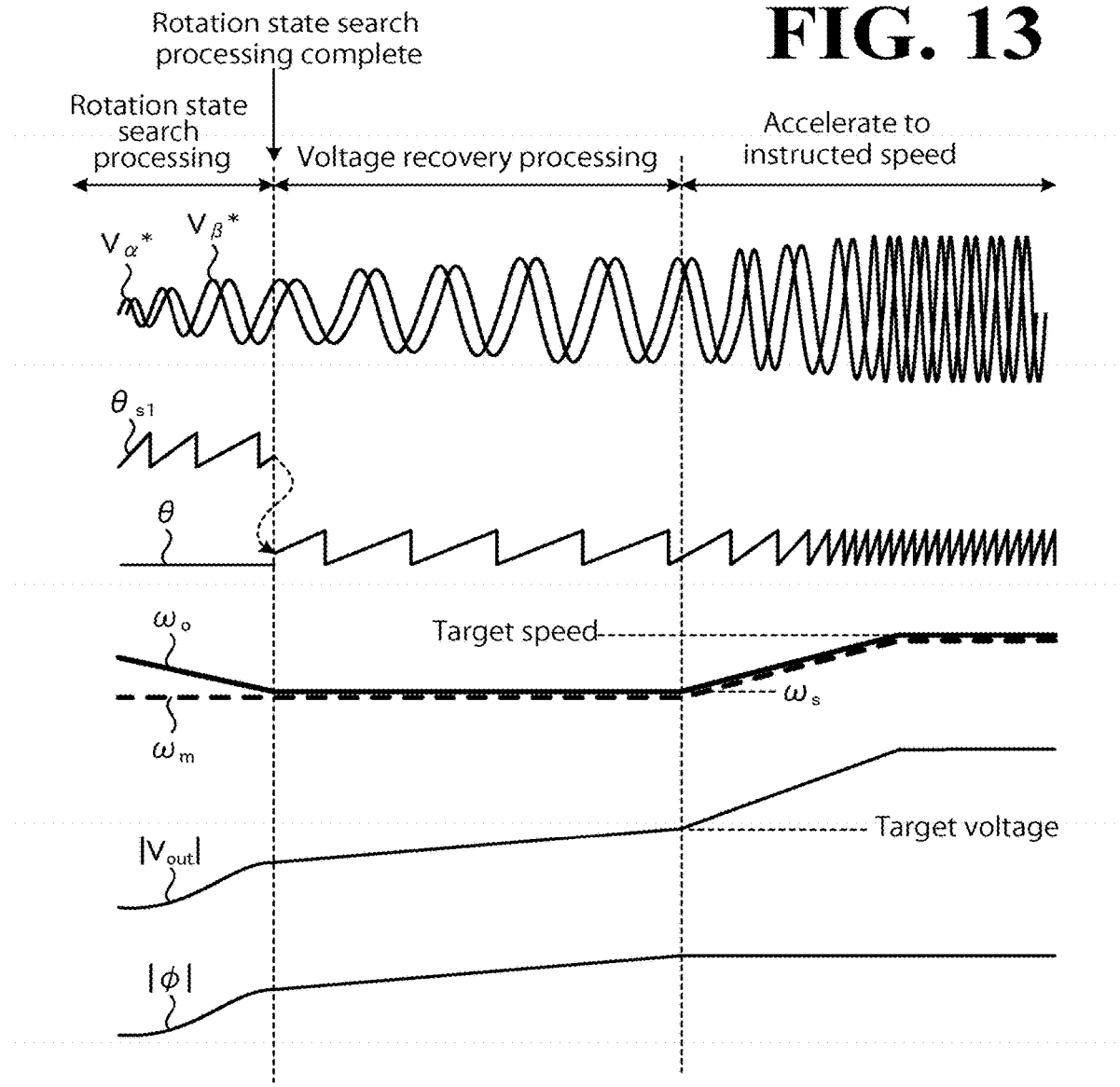
FIG. 13 illustrates how state amounts are changing in rotation state search processing, voltage recovery processing, and acceleration processing.

In the above-described manner, the rotational frequency $\omega_{ma}$ of the motor 3 and the rotation direction $D_m$ of the motor 3 are detected by the rotation state searcher 22. Then, the V/f controller 32 performs voltage recovery processing and acceleration processing. FIG. 13 illustrates how state amounts are changing in the rotation state search processing, the voltage recovery processing, and the acceleration processing. The symbol "$\omega_o$" illustrated in FIG. 13 denotes the frequency of the output voltage of the inverter 10 (this output voltage will be hereinafter referred to as output voltage $V_{out}$).

The drive controller 21 obtains from the rotation state searcher 22 a voltage phase $\theta_{s1}$ and a voltage amplitude $V_m$ that correspond to the time at which the rotation state searcher 22 finishes determining the rotational frequency $\omega_{ma}$ of the motor 3 and the rotation direction $D_m$ of the motor 3. For example, the voltage phase $\theta_{s1}$ is obtained by the phase calculator 34, and the voltage amplitude $V_m$ is obtained by the V/f controller 32.

In the voltage recovery processing, the V/f controller 32 sets, at the coordinate converter 35, an initial value of the q-axis voltage command $V_q^*$ (which is a non-limiting example of the level of the output voltage) and an initial value of the phase θ (which is a non-limiting example of the phase of the output voltage). For example, the V/f controller 32 uses the voltage amplitude $V_m$ obtained from the rotation state searcher 22 as the initial value of the q-axis voltage command $V_q^*$, and outputs the voltage amplitude $V_m$ to the coordinate converter 35.

The phase calculator 34 uses "$\theta_{s1}+\pi/2$" or "$\theta_{s1}-\pi/2$" as the initial value of the phase θ. For example, when the rotation direction $D_m$ of the motor 3 is normal direction, the phase calculator 34 uses "$\theta_{s1}-\pi/2$" as the initial value of the phase θ. When the rotation direction $D_m$ of the motor 3 is reverse direction, the phase calculator 34 uses "$\theta=\theta_{s1}+\pi/2$" as the initial value of the phase θ. This configuration is because the controller 20 defines flux phase as rotational coordinate system phase.

In the voltage recovery processing, after the V/f controller 32 has set the initial value of the q-axis voltage command $V_q^*$ and the initial value of the phase θ at the coordinate converter 35, the V/f controller 32 increases the secondary flux φ of the motor 3 to a rated value by gradually increasing the q-axis voltage command $V_q^*$ to return the output voltage $V_{out}$ of the inverter 10 to a target voltage.

Specifically, the V/f controller 32 increases the q-axis voltage command $V_q^*$ by ΔV per unit time, which is the slope of ΔV. This configuration eliminates or minimizes rapid change in the voltage of the motor 3.

The target voltage of the output voltage $V_{out}$ corresponds to the value of the q-axis voltage command $V_q^*$ output from the V/f controller 32 under the assumption that the speed command ω* is identical to the rotational frequency $\omega_{ma}$ of the motor 3 detected by the rotation state searcher 22 ($\omega^*=\omega_{ma}$). This configuration ensures that the output voltage $V_{out}$ is returned to its target voltage with the rotational frequency $\omega_{ma}$ of the motor 3 fixed (that is, with the state "$\omega^*=\omega_{ma}$" fixed).

When the speed command ω* output from the frequency command generator 31 is lower than the detected rotational frequency $\omega_{ma}$, the V/f controller 32 gradually increases the q-axis voltage command $V_q^*$ to a value that is based on the speed command ω* output from the frequency command generator 31. This configuration accelerates the rotation of the motor 3, making the rotational frequency $\omega_{ma}$ of the motor 3 identical to the speed command ω* output from the frequency command generator 31.

Thus, after the controller 20 has performed the rotation state search processing, the controller 20 performs the voltage recovery processing and the acceleration processing. This configuration enables the controller 20 to adjust the rotational frequency $\omega_{ma}$ of the motor 3 so as to make the rotational frequency $\omega_{ma}$ of the motor 3 identical to the speed command ω*.

4. Processing Performed by Controller 20

Figure 14:
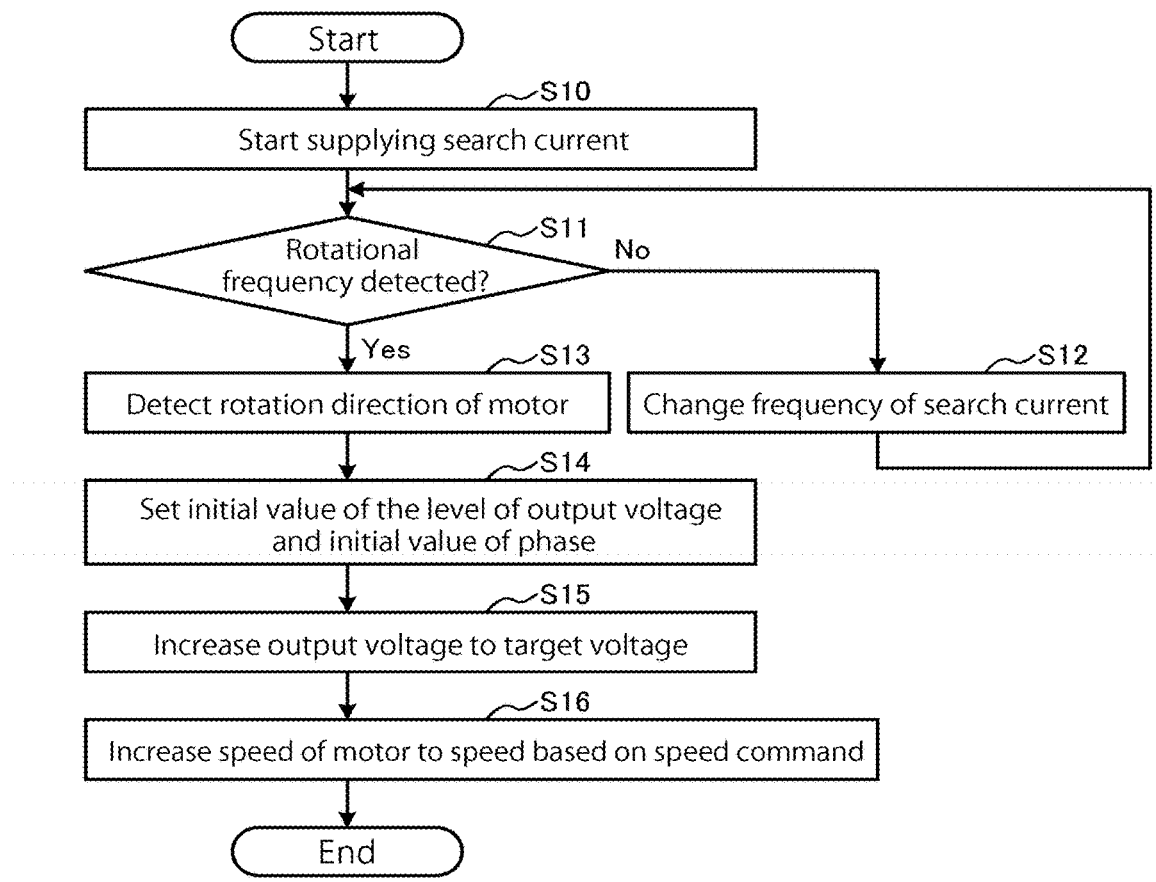
FIG. 14 is a flowchart of the rotation state search processing, the voltage recovery processing, and the acceleration processing.

Next, the rotation state search processing, the voltage recovery processing, and the acceleration processing performed by the controller 20 will be described. FIG. 14 is a flowchart of the rotation state search processing, the voltage recovery processing, and the acceleration processing.

As illustrated in FIG. 14, the rotation state searcher 22 starts the rotation state search processing. Specifically, the rotation state searcher 22 controls the inverter 10 to supply the search current $I_s$ from the inverter 10 to the motor 3 (step S10).

For example, the rotation state searcher 22 generates a α-axis superposition current command $I_{i\alpha}*$ by the operation represented by Formula (3) and a β-axis superposition current command $I_{i\beta}*$ that is set at zero. This configuration ensures that the search current $I_s$ that is based on the α-axis superposition current command $I_{i\alpha}*$ and the β-axis superposition current command $I_{i\beta}*$ is supplied from the inverter 10 to the motor 3.

Figure 15:
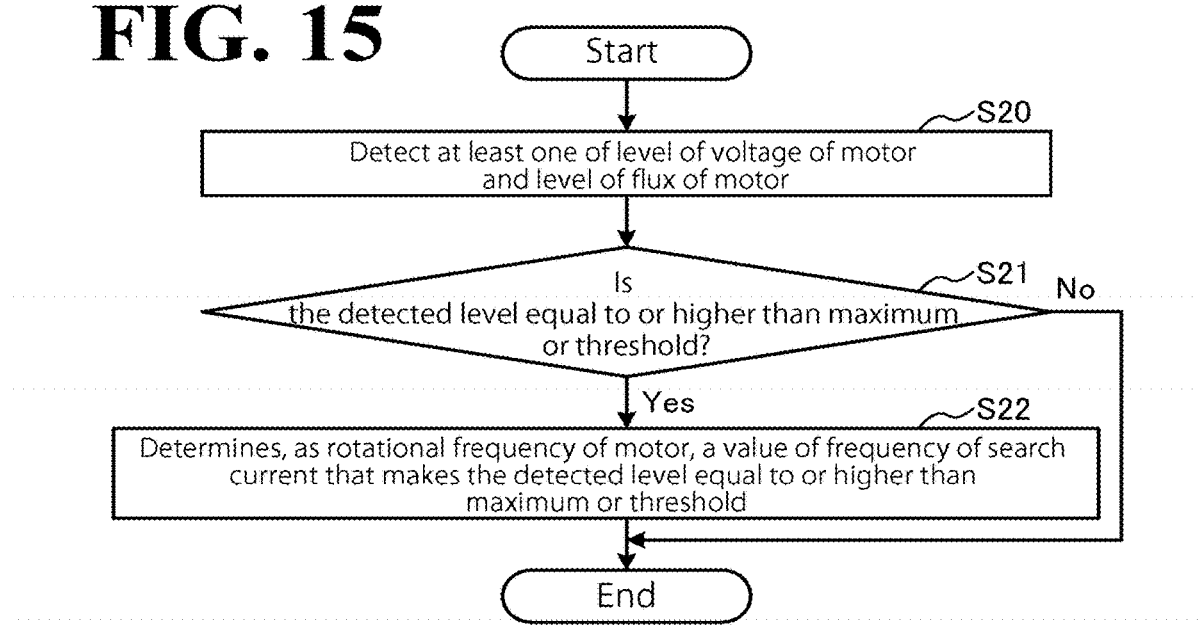
FIG. 15 is a flowchart of step S11 illustrated in FIG. 14.

Next, the rotation state searcher 22 determines whether the rotational frequency $\omega_{ma}$ of the motor 3 has been detected (step S11). FIG. 15 is a flowchart of step S11 illustrated in FIG. 14.

As illustrated in FIG. 15, the rotation state searcher 22 detects the level of the voltage of the motor 3 and the level of the flux of the motor 3 (for example, voltage amplitude $V_m$ or secondary flux φ) (step S20). Then, the rotation state searcher 22 determines whether at least one of the level of the voltage of the motor 3 and the level of the flux of the motor 3 detected at step S20 has become equal to or higher than a maximum value or a threshold (a non-limiting example of the threshold is set based on a fixed value or frequency $\omega_s$) (step S21).

When the determination made by the rotation state searcher 22 at step S21 is that at least one of the voltage of the motor 3 and the flux of the motor 3 has become equal to or higher than a maximum value or a threshold (Yes at step S21), the rotation state searcher 22 determines, as the rotational frequency $\omega_{ma}$ of the motor 3, a value of the frequency $\omega_s$ of the search current $I_s$ that makes at least one of the level of the voltage of the motor 3 and the level of the flux of the motor 3 equal to or higher than a maximum value or a threshold. In this manner, the rotation state searcher 22 determines that the rotational frequency $\omega_{ma}$ of the motor 3 has been detected (step S22).

When, after the end of step S22 or at step S21, the determination made by the rotation state searcher 22 is that none of the voltage of the motor 3 nor the flux of the motor 3 has become equal to or higher than a maximum value or a threshold (No at step S21), the rotation state searcher 22 ends step at S11.

When at step S11 the determination made by the rotation state searcher 22 is that no rotational frequency $\omega_{ma}$ of the motor 3 has been detected (No at step S11), the rotation state searcher 22 changes the frequency $\omega_s$ of the search current $I_s$ at step S12 illustrated in FIG. 14. In a possible embodiment, the frequency $\omega_s$ of the search current $I_s$ is changed by changing the frequency $\omega_s$ in Formula (3). In another possible embodiment, the frequency $\omega_s$ of the search current $I_s$ is changed by lowering the frequency $\omega_s$ of the search current $I_s$ by $\Delta\omega$.

When at step S11 illustrated in FIG. 14 the determination made by the rotation state searcher 22 is that the rotational frequency $\omega_{ma}$ of the motor 3 has been detected (Yes at step S11), the rotation state searcher 22 detects the rotation direction $D_m$ of the motor 3 based on at least one of the voltage of the motor 3 and the flux of the motor 3 (step S13).

Figure 16:
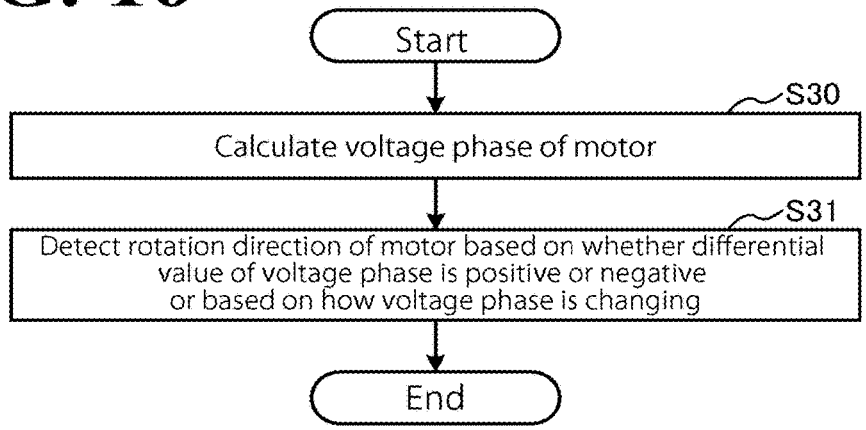
FIG. 16 is a flowchart of step S13 illustrated in FIG. 14.

FIG. 16 is a flowchart of step S13 illustrated in FIG. 14. As illustrated in FIG. 16, the rotation state searcher 22 calculates the voltage phase $\theta_{s1}$ of the motor 3 (step S30), and detects the rotation direction $D_m$ of the motor 3 based on whether a differential value of the voltage phase $\theta_{s1}$ is positive or negative or based on how the voltage phase $\theta_{s1}$ is changing (by referring to its slope, for example) (step S31). In another possible embodiment, the rotation state searcher 22 may detect the rotation direction $D_m$ of the motor 3 based on the phase difference between the voltage of one axis of the motor 3 and the voltage of the second axis of the motor 3.

After the rotational frequency $\omega_{ma}$ of the motor 3 and the rotation direction $D_m$ of the motor 3 have been detected in the rotation state search processing, the drive controller 21 performs the voltage recovery processing. In the voltage recovery processing, at step S14 illustrated in FIG. 14, the drive controller 21 sets an initial value of the q-axis voltage command $V_q*$ (which is a non-limiting example of the level of the output voltage) and an initial value of the phase θ (which is a non-limiting example of the phase of the output voltage).

For example, the drive controller 21 sets, as the initial value of the q-axis voltage command $V_q*$, a voltage amplitude $V_m$ that corresponds to the time at which the rotation state search processing ends, and sets, as the initial value of the phase θ, a sum of "+π/2" or "−π/2" and a voltage phase $\theta_{s1}$ that corresponds to the time at which the rotation state search processing ends.

Next, the drive controller 21 gradually increases the q-axis voltage command $V_q*$ so as to return the output voltage $V_{out}$ to its target voltage (step S15). When the output voltage $V_{out}$ reaches its target value, the drive controller 21 gradually increases the q-axis voltage command $V_q*$ to an output voltage $V_{out}$ that is based on the speed command $\omega*$, thereby increasing the speed of the motor 3 to the speed that is based on the speed command $\omega*$ (step S16).

In this embodiment, the motor 3 is a bipolar motor. Because of the bipolar nature of the motor 3, the electrical angle frequency, $\omega_e$, of the motor 3 is approximately identical to the machine angular velocity, $\omega_{mech}$, of the motor 3. Therefore, the rotational frequency $\omega_{ma}$ of the motor 3 detected by the rotational frequency detector 48 can be rephrased as the electrical angle frequency $\omega_e$ of the motor 3 or as the machine angular velocity $\omega_{mech}$ of the motor 3.

In this embodiment, the rotational frequency detector 48 and the rotation direction detector 49 detect the rotational frequency $\omega_{ma}$ of the motor 3 and the rotation direction $D_m$ of the motor 3 based on the α-axis voltage command $V_\alpha*$ and the β-axis voltage command $V_\beta*$. This configuration, however, is not intended in a limiting sense.

In another possible embodiment, the rotational frequency detector 48 and the rotation direction detector 49 may detect the rotational frequency $\omega_{ma}$ of the motor 3 and the rotation direction $D_m$ of the motor 3 based on the α-axis superposition voltage command $V_{i\alpha}*$ and the β-axis superposition voltage command $V_{i\beta}*$. In this case, the rotational frequency detector 48 and the rotation direction detector 49 use the α-axis superposition voltage command $V_{i\alpha}*$, instead of the α-axis voltage command $V_\alpha*$, and use the β-axis superposition voltage command $V_{i\beta}*$, instead of the β-axis voltage command $V_\beta*$.

Figure 17:
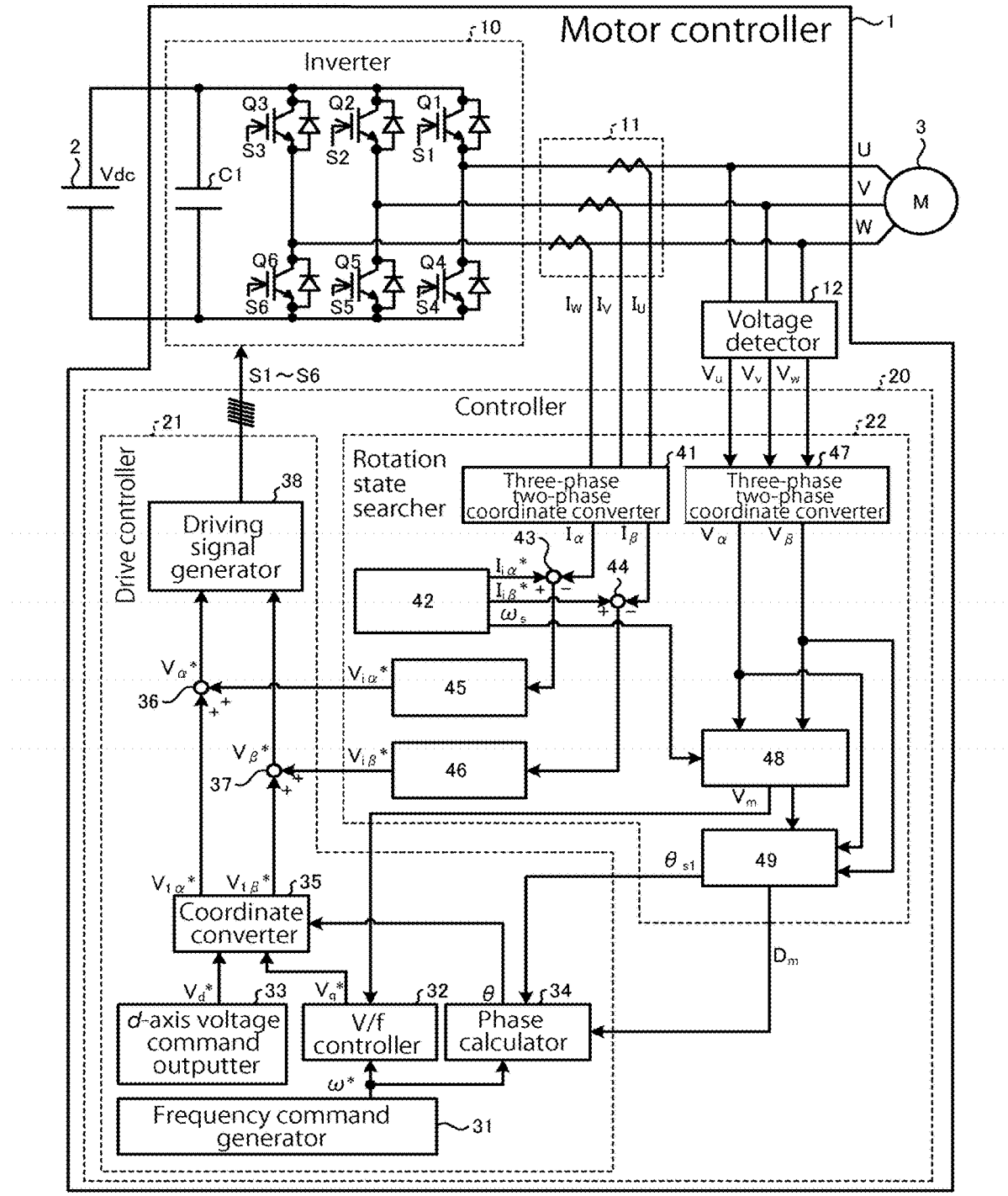
FIG. 17 is a diagram illustrating another exemplary configuration of the motor controller illustrated in FIG. 1.

In still another possible embodiment, the rotational frequency detector 48 and the rotation direction detector 49 may detect the rotational frequency $\omega_{ma}$ of the motor 3 and the rotation direction $D_m$ of the motor 3 based on α-axis detected voltage $V_\alpha$ and β-axis detected voltage $V_\beta$. FIG. 17 is a diagram illustrating another exemplary configuration of the motor controller 1 illustrated in FIG. 1.

The motor controller 1 illustrated in FIG. 17 includes the voltage detector 12 illustrated in FIG. 1 to detect instantaneous values $V_u$, $V_v$, and $V_w$ of the voltages of the U phase, the V phase, and the W phase of the motor 3 (these instantaneous values will be hereinafter referred to as detected voltages $V_u$, $V_v$, and $V_w$).

The rotation state searcher 22 also includes a three-phase/two-phase coordinate converter 47. The three-phase/two-phase coordinate converter 47 performs three-phase/two-phase conversion of the detected voltages $V_u$, $V_v$, and $V_w$ to obtain the α-axis detected voltage $V_α$ and the β-axis detected voltage $V_β$. The α-axis detected voltage $V_α$ of the detected voltage $V_o$ is an α-axis component of an α-β axis coordinate system, and the β-axis detected voltage $V_β$ of the detected voltage $V_o$ is a β-axis component of the α-β axis coordinate system.

The rotational frequency detector 48 and the rotation direction detector 49 use the α-axis detected voltage $V_α$, instead of the α-axis voltage command $V_α^*$, and use the β-axis detected voltage $V_β$, instead of the β-axis voltage command $V_β^*$. The rotational frequency detector 48 and the rotation direction detector 49 illustrated in FIG. 17 are otherwise similar to the rotational frequency detector 48 and the rotation direction detector 49 illustrated in FIG. 2, except that the rotational frequency detector 48 and the rotation direction detector 49 illustrated in FIG. 17 use the α-axis detected voltage $V_α$, instead of the α-axis voltage command $V_α^*$, and use the β-axis detected voltage $V_β$, instead of the β-axis voltage command $V_β^*$.

In a possible embodiment, after the rotational frequency $ω_{ma}$ of the motor 3 has been detected, the rotation direction detector 49 may, with voltage supply from the inverter 10 to the motor 3 stopped, detect the rotation direction $D_m$ of the motor 3 based on the α-axis detected voltage $V_α$ and the β-axis detected voltage $V_β$. In this case, after the rotational frequency detector 48 has detected the rotational frequency $ω_{ma}$ of the motor 3, the drive controller 21 controls the inverter 10 to turn off all the switching elements Q1 to Q6 of the inverter 10. In this manner, voltage supply from the inverter 10 to the motor 3 is stopped.

As described above, the motor controller according to the embodiment 1 includes the inverter 10 and the controller 20. The inverter 10 supplies power to the motor 3. The controller 20 controls the inverter 10 to supply the search current $I_s$ (which is a non-limiting example of the AC current recited in the appended claims) to a first axis of a stationary orthogonal coordinate system (for example, α-β axis coordinate system) while changing the frequency $ω_s$ of the search current $I_s$. The first axis has a predetermined phase relationship with the phase voltage of the motor 3.

By supplying the search current $I_s$ to the first axis of the stationary orthogonal coordinate system having a predetermined phase relationship with the phase voltage of the motor 3, the secondary flux φ of the motor 3 is excited. The secondary flux φ rotates together with the rotation of the motor 3 (the rotation of the rotor of the motor 3), and increases as the degree of agreement increases between the frequency $ω_s$ of the search current $I_s$ and the rotational frequency $ω_{ma}$ of the motor 3. This configuration ensures that even if no detectable amount of residual flux remains on the motor 3 after, for example, recovery from an instantaneous power failure, changing the frequency $ω_s$ of the search current $I_s$ causes the secondary flux φ to be generated and enhanced. As a result, how the motor 3 is rotating is detected with improved accuracy. In this embodiment, an α-β axis coordinate system has been described as the stationary orthogonal coordinate system having the first axis having a predetermined phase relationship with the phase voltage of the motor 3. In another possible embodiment, the stationary orthogonal coordinate system having the first axis having a predetermined phase relationship with the phase voltage of the motor 3 may be a stationary orthogonal coordinate system resulting from turning the α-β axis coordinate system about its origin by a predetermined angle $D_a$. In this case, the controller 20 may control the inverter 10 to, while changing the frequency $ω_s$, supply the search current $I_s$ toward, for example, a direction that is displaced by the predetermined angle $D_a$ from the α-axis or the β-axis of the α-β axis coordinate system.

The controller 20 also includes the rotational frequency detector 48. The rotational frequency detector 48 detects the rotational frequency $ω_{ma}$ of the motor 3 based on at least one of the voltage of the motor 3 (for example, the voltage amplitude $V_m$, the α-axis voltage command $V_α^*$, and the β-axis voltage command $V_β^*$) and the secondary flux φ of the motor 3 (which is a non-limiting example of the flux recited in the appended claims) while the search current $I_s$ is being supplied to the motor 3.

In the supply of the search current $I_s$, the secondary flux φ of the motor 3 increases as the degree of agreement increases between the frequency $ω_s$ of the search current $I_s$ and the rotational frequency $ω_{ma}$ of the motor 3, causing the voltage of the motor 3 to increase accordingly. As a result, the rotational frequency $ω_{ma}$ of the motor 3 is detected with improved accuracy based on the flux of the motor 3 or the voltage of the motor 3. By detecting the rotational frequency $ω_{ma}$ of the motor 3 based on the voltage of the motor 3, the rotational frequency $ω_{ma}$ of the motor 3 is more readily detected. By determining the voltage of the motor 3 based on the superposition voltage command $V_i$ (which is generated for the purpose of causing the search current $I_s$ to flow and which is a non-limiting example of the voltage command recited in the appended claims), the configuration to detect the rotational frequency $ω_{ma}$ of the motor 3 is simplified.

The rotational frequency detector 48 determines, as the rotational frequency $ω_{ma}$ of the motor 3, a value of the frequency $ω_s$ of the search current $I_s$ that maximizes at least one of the voltage of the motor 3 and the secondary flux φ of the motor 3. When the frequency of the search current $I_s$ and the rotational frequency $ω_{ma}$ of the motor 3 agree with each other, the flux of the motor 3 and the voltage of the motor 3 are at their maximum. In view of this, the rotational frequency detector 48 detects a value of the frequency $ω_s$ of the search current $I_s$ that maximizes the secondary flux φ of the motor 3 and/or the voltage of the motor 3. This configuration facilitates, and improves the accuracy of, detection of the rotational frequency $ω_{ma}$ of the motor 3.

The rotational frequency detector 48 also determines, as the rotational frequency $ω_{ma}$ of the motor 3, a value of the frequency $ω_s$ of the search current $I_s$ that makes at least one of the voltage of the motor 3 (for example, the voltage amplitude $V_m$) or the secondary flux φ of the motor 3 equal to or higher than a threshold (for example, the threshold voltage $V_{th}$) that is based on the frequency $ω_s$ of the search current $I_s$.

By providing a threshold with which to compare the voltage of the motor 3, the rotational frequency $ω_{ma}$ of the motor 3 is more readily detected than when the maximum itself is detected. Additionally, providing a threshold that is based on the frequency $ω_s$ of the search current $I_s$ facilitates, and improves the accuracy of, detection of the rotational frequency $ω_{ma}$ of the motor 3. For example, the level of the drive voltage of the motor 3 varies depending on the frequency of the drive voltage, and the voltage caused by the search current $I_s$ also varies. Thus, a threshold to detect the rotational frequency $ω_{ma}$ of the motor 3 is set with improved accuracy.

The controller 20 also includes the rotation direction detector 49. The rotation direction detector 49 detects the rotation direction $D_m$ of the motor 3 based on the voltage of the motor 3 caused by the search current $I_s$ (for example, the α-axis voltage command $V_\alpha^*$ and the β-axis voltage command $V_\beta^*$).

Thus, the rotation direction detector 49 is capable of detecting the rotation direction $D_m$ of the motor 3 based on the voltage of the motor 3 caused by the search current $I_s$. This configuration ensures that the rotation direction $D_m$ of the motor 3 can be detected at the time when, for example, the rotational frequency $\omega_{ma}$ of the motor 3 is detected. In another possible embodiment, the rotation direction $D_m$ of the motor 3 may be detected subsequently after the rotational frequency $\omega_{ma}$ of the motor 3 has been detected.

The rotation direction detector 49 determines the rotation direction $D_m$ of the motor 3 based on the phase difference between the voltage of the first axis (for example, the α-axis voltage command $V_\alpha^*$) and the voltage of the second axis (for example, the β-axis voltage command $V_\beta^*$) of the α-β axis coordinate system (which is a non-limiting example of the stationary orthogonal coordinate system having the first axis having a predetermined phase relationship with the phase voltage of the motor 3).

This configuration ensures that the rotation direction $D_m$ of the motor 3 is more readily detected by determining whether the phase difference between the α-axis voltage command $V_\alpha^*$ and the β-axis voltage command $V_\beta^*$ is negative or positive. Specifically, there is 90-degree phase difference between the α-axis voltage command $V_\alpha^*$ and the β-axis voltage command $V_\beta^*$, and by determining whether the β-axis voltage command $V_\beta^*$ is ahead of or behind the α-axis voltage command $V_\alpha^*$, the rotation direction $D_m$ of the motor 3 is more readily detected.

The rotation direction detector 49 includes the phase calculator 61 and the first rotation direction determiner 62 (which is a non-limiting example of the rotation direction determiner recited in the appended claims). The phase calculator 61 calculates the voltage phase $\theta_{s1}$ of the motor 3 based on the voltage of the motor 3 (for example, the α-axis detected voltage $V_\alpha$ and the β-axis detected voltage $V_\beta$). The first rotation direction determiner 62 determines the rotation direction $D_m$ of the motor 3 based on how the voltage phase $\theta_{s1}$ of the motor 3 calculated by the phase calculator 61 is changing.

How the voltage phase $\theta_{s1}$ of the motor 3 is changing depends on the rotation direction $D_m$ of the motor 3. In view of this, the phase calculator 61 calculates the voltage phase $\theta_{s1}$ of the motor 3 and detects how the voltage phase $\theta_{s1}$ is changing. This configuration ensures that the rotation direction $D_m$ of the motor 3 is detected with improved accuracy.

The rotation direction detector 49 detects the rotation direction $D_m$ of the motor 3 based on the voltage of the motor 3 (for example, the α-axis voltage command $V_\alpha^*$ and the β-axis voltage command V) that is caused by the search current $I_s$ and that is detected after the search current $I_s$ has stopped being supplied.

When the search current $I_s$ stops being supplied after the search current $I_s$ has caused the motor 3 to generate the secondary flux φ, a residual flux remains on the motor 3. The rotation direction detector 49 detects the voltage of the motor 3 based on the residual flux of the motor 3, which is occurring after the search current $I_s$ has stopped being supplied. This configuration ensures that the rotation direction $D_m$ of the motor 3 is detected with further improved accuracy.

The controller 20 also includes the superposition current command generator 42 (which is a non-limiting example of the current command generator recited in the appended claims), the α-axis current controller 45, the β-axis current controller 46 (which is a non-limiting example of the current controller recited in the appended claims), the drive controller 21, and the rotation direction detector 49. The superposition current command generator 42 generates an α-axis superposition current command $I_{i\alpha}^*$ and a β-axis superposition current command $I_{i\beta}^*$ that correspond to the search current $I_s$ (these commands are non-limiting examples of the current command corresponding to the AC current recited in the appended claims). The α-axis current controller 45 generates the α-axis superposition voltage command $V_{i\alpha}^*$ based on the difference between the α-axis superposition current command $I_{i\alpha}^*$ and the α-axis detected current $I_\alpha$ (which is a non-limiting example of the current flowing through the motor recited in the appended claims). The β-axis current controller 46 generates the β-axis superposition voltage command $V_{i\beta}^*$ based on the difference between the β-axis superposition current command $I_\beta^*$ and the β-axis detect current $I_\beta$ (which is a non-limiting example of the current flowing through the motor recited in the appended claims). The drive controller 21 controls the search current $I_s$ to be supplied to the inverter 10 based on a α-axis voltage command $V_\alpha^*$ on which the α-axis superposition voltage command $V_{i\alpha}^*$ is superposed and based on a β-axis voltage command $V_\beta^*$ on which the β-axis superposition voltage command $V_{i\beta}^*$ is superposed. The rotation direction detector 49 detects the rotation direction $D_m$ of the motor 3 based on the α-axis voltage command $V_\alpha^*$ and the β-axis voltage command $V_\beta^*$ (which are non-limiting examples of the voltage command recited in the appended claims) or based on the α-axis superposition voltage command $V_{i\alpha}^*$ and the β-axis superposition voltage command $V_{i\beta}^*$ (which are non-limiting examples of the voltage command recited in the appended claims).

Thus, the rotation direction $D_m$ of the motor 3 is detected based on the α-axis superposition voltage command $V_{i\alpha}^*$ and the β-axis superposition voltage command $V_{i\beta}$, which are generated for the purpose of causing the search current $I_s$ to flow. This configuration eliminates the need for the processing to directly detect the voltage of the motor 3, and simplifies the configuration to detect the rotation direction $D_m$ of the motor 3.

The motor controller 1 includes the inverter 10 and the controller 20. The inverter 10 supplies power to the motor 3. The controller 20 controls the inverter 10 to supply the search current $I_s$ to a first axis of a stationary orthogonal coordinate system (for example, α-β axis coordinate system). The first axis has a predetermined phase relationship with the phase voltage of the motor 3.

In the supply of the search current $I_s$, when the rotational frequency $\omega_{ma}$ of the motor 3 is approximate to the frequency $\omega_s$ of the search current $I_s$, the secondary flux φ of the motor 3 is increased by the search current $I_s$. In view of this, when a reduction in the rotational frequency $\omega_{ma}$ of the motor 3 after the motor 3 has transitioned to free-run state can be estimated, the supplied search current $I_s$ is made to have a frequency $\omega_s$ that corresponds to the estimated rotational frequency $\omega_{ma}$ of the motor 3. This configuration causes a secondary flux φ to occur and ensures that the rotation direction $D_m$ of the motor 3 is more readily detected.

The controller 20 also controls the inverter 10 to supply the search current $I_s$ to the first axis (for example, the α-axis) of the stationary orthogonal coordinate system (for example, α-β axis coordinate system) so as to make a current of a second axis (for example, the β-axis) zero. This configuration eliminates or minimizes the influence that currents other than the AC current flowing through the first axis have on the voltage of the motor 3. As a result, how the motor 3 is rotating is detected with improved accuracy.

The motor controller 1 includes the inverter 10 and the rotation state searcher 22. The inverter 10 supplies power to the motor 3. The rotation state searcher 22 is a non-limiting example of the "means for controlling the inverter to generate an AC current and supply the AC current to an axis of a stationary orthogonal coordinate system of the motor and for detecting at least one of a rotational frequency of the motor and a rotation direction of the motor based on at least one of a voltage of the motor and a current of the motor".

In the embodiment of FIG. 2, the motor controller 1 performs V/f control to control the motor 3. In another possible embodiment, the motor controller 1 may perform vector control to control the motor 3. The arrows illustrated in the drawings, such as FIGS. 1 to 3, 8, and 10, exemplify directions of flows of data and control, and are not intended to exclude other flows and directions.

In the above-described embodiment, the secondary flux of the motor 3 and the induced voltage of the motor 3 are maximized when a search current $I_s$ having a frequency $\omega_s$ identical to the rotational frequency $\omega_{ma}$ of the motor 3 is supplied to the motor 3. This configuration, however, is not intended as limiting the motor. In another possible embodiment, the secondary flux of the motor 3 and the induced voltage of the motor 3 may be maximized when the rotational frequency $\omega_{ma}$ of the motor 3 and the frequency $\omega_s$ of the search current $I_s$ have a predetermined relationship. In this case as well, how the motor 3 is rotating is detected with improved accuracy.

Obviously, numerous modifications and error of the present disclosure are possible in light of the above teachings. It is therefore to be understood that within the scope of the appended claims, the present disclosure may be practiced otherwise than as specifically described herein.

What is claimed is:

1. A motor controller, comprising:
   an inverter comprising circuitry configured to supply power to a motor; and
   a controller comprising circuitry configured to control the inverter such that the circuitry of the inverter supplies an AC current to only a first axis of a stationary orthogonal coordinate system in the motor while changing a frequency of the AC current,
   wherein the first axis has a predetermined phase relationship with a phase voltage of the motor.

2. The motor controller according to claim 1, wherein the circuitry of the controller is configured to detect a rotational frequency of the motor based on at least one of a first voltage of the motor and a flux of the motor while the AC current is being supplied to the motor.

3. The motor controller according to claim 2, wherein the circuitry of the controller is configured to determine, as the rotational frequency of the motor, a value of the frequency of the AC current that maximizes at least one of the first voltage of the motor and the flux of the motor.

4. The motor controller according to claim 2, wherein the circuitry of the controller is configured to determine, as the rotational frequency of the motor, a value of the frequency of the AC current that makes at least one of the first voltage of the motor and the flux of the motor equal to or higher than a threshold.

5. The motor controller according to claim 4, wherein the threshold is based on the frequency of the AC current.

6. The motor controller according to claim 1, wherein the circuitry of the controller is configured to detect a rotation direction of the motor based on a second voltage of the motor that is caused by the AC current.

7. The motor controller according to claim 6, wherein the circuitry of the controller is configured to determine the rotation direction of the motor based on a phase difference between a voltage of the first axis of the stationary orthogonal coordinate system and a voltage of a second axis of the stationary orthogonal coordinate system.

8. The motor controller according to claim 6, wherein the circuitry of the controller is configured to calculate a voltage phase of the motor based on at least one of the first voltage and the second voltage of the motor, and determine the rotation direction of the motor based on how the voltage phase of the motor calculated by the phase calculator is changing.

9. The motor controller according to claim 6, wherein the circuitry of the controller is configured to detect the rotation direction of the motor based on a third voltage of the motor that is caused by the AC current and that is detected after supply of the AC current is stopped.

10. The motor controller according to claim 1, wherein the circuitry of the controller is configured to generate a current command corresponding to the AC current, generate a voltage command based on a difference between the current command a current flowing through the motor, control the AC current to be supplied to the inverter based on the voltage command, and detect a rotation direction of the motor based on the voltage command.

11. The motor controller according to claim 1, wherein the circuitry of the controller is configured to control the inverter such that the inverter supplies the AC current to make a current of a second axis of the stationary orthogonal coordinate system in the motor zero.

12. The motor controller according to claim 2, wherein the circuitry of the controller is configured to detect a rotation direction of the motor based on a second voltage of the motor that is caused by the AC current.

13. The motor controller according to claim 3, wherein the circuitry of the controller is configured to detect a rotation direction of the motor based on a second voltage of the motor that is caused by the AC current.

14. The motor controller according to claim 4, wherein the circuitry of the controller is configured to detect a rotation direction of the motor based on a second voltage of the motor that is caused by the AC current.

15. The motor controller according to claim 5, wherein the circuitry of the controller is configured to detect a rotation direction of the motor based on a second voltage of the motor that is caused by the AC current.

16. The motor controller according to claim 15, wherein the circuitry of the controller is configured to determine the rotation direction of the motor based on a phase difference between a voltage of the first axis of the stationary orthogonal coordinate system and a voltage of a second axis of the stationary orthogonal coordinate system in the motor.

17. A motor controller, comprising:
    an inverter comprising circuitry configured to supply power to a motor; and
    a controller comprising circuitry configured to control the inverter such that the circuitry of the inverter supplies an AC current to only a first axis of a stationary orthogonal coordinate system in the motor,
    wherein the first axis has a predetermined phase relationship with a phase voltage of the motor.

18. The motor controller according to claim 12, wherein the circuitry of the controller is configured to detect a rotation direction of the motor based on a voltage of the motor that is caused by the AC current.

19. A method for controlling a motor, comprising:
controlling an inverter using a controller comprising circuitry such that the inverter supplies an AC current to only an axis of a stationary orthogonal coordinate system; and
controlling the inverter using the controller comprising the circuitry such that the inverter changes a frequency of the AC current supplied from the inverter,
wherein the axis has a predetermined phase relationship with a phase voltage of the motor.

20. A motor controller, comprising:
an inverter comprising circuitry configured to supply power to a motor; and
means for controlling the inverter such that the inverter generates an AC current and supplies the AC current to only an axis of a stationary orthogonal coordinate system of the motor and detecting at least one of a rotational frequency of the motor and a rotation direction of the motor based on at least one of a voltage of the motor and a current of the motor.

\* \* \* \* \*